United States Patent [19]

Papazian et al.

[11] 4,319,626
[45] Mar. 16, 1982

[54] CHEMICAL STORAGE OF ENERGY

[75] Inventors: Harold A. Papazian, Holtville, Calif.; Murlin T. Howerton, Denver, Colo.

[73] Assignee: Martin Marietta Corp., Bethesda, Md.

[21] Appl. No.: 809,647

[22] Filed: Jun. 24, 1977

Related U.S. Application Data

[63] Continuation-in-part of Ser. No. 702,838, Jul. 6, 1976, abandoned.

[51] Int. Cl.³ .............................................. F23D 21/00
[52] U.S. Cl. .................................. 165/1; 165/104.12; 122/21
[58] Field of Search ........... 60/644, 649, 673, DIG. 4; 165/2, DIG. 17, 1, 104.12; 62/112; 122/21

[56] References Cited
U.S. PATENT DOCUMENTS 3,183,680  5/1965  Billi ...................................... 62/112

OTHER PUBLICATIONS

Althouse et al., Modern Refrigeration and Air Conditioning, The Goodheart Willcox Co., Inc., South Holland, Ill., 1975, pp. 603 to 608.
Hanneman, 9th Intersociety Energy Conversion Engineering Conference, 1974, pub. by American Society of Mechanical Engineers, N.Y., N.Y., pp. 435 to 441.

Primary Examiner—Edward A. Miller
Attorney, Agent, or Firm—Gay Chin; Herbert W. Mylius

[57] ABSTRACT

A method of storing energy at ambient temperature and recovering same at an elevated temperature which comprises decomposition of a chemical compound at high temperature with a second compound being used to form another product at low temperature. Upon regeneration of the decomposition product from the first compound there is a release of the originally absorbed high temperature thermal energy.

17 Claims, 24 Drawing Figures

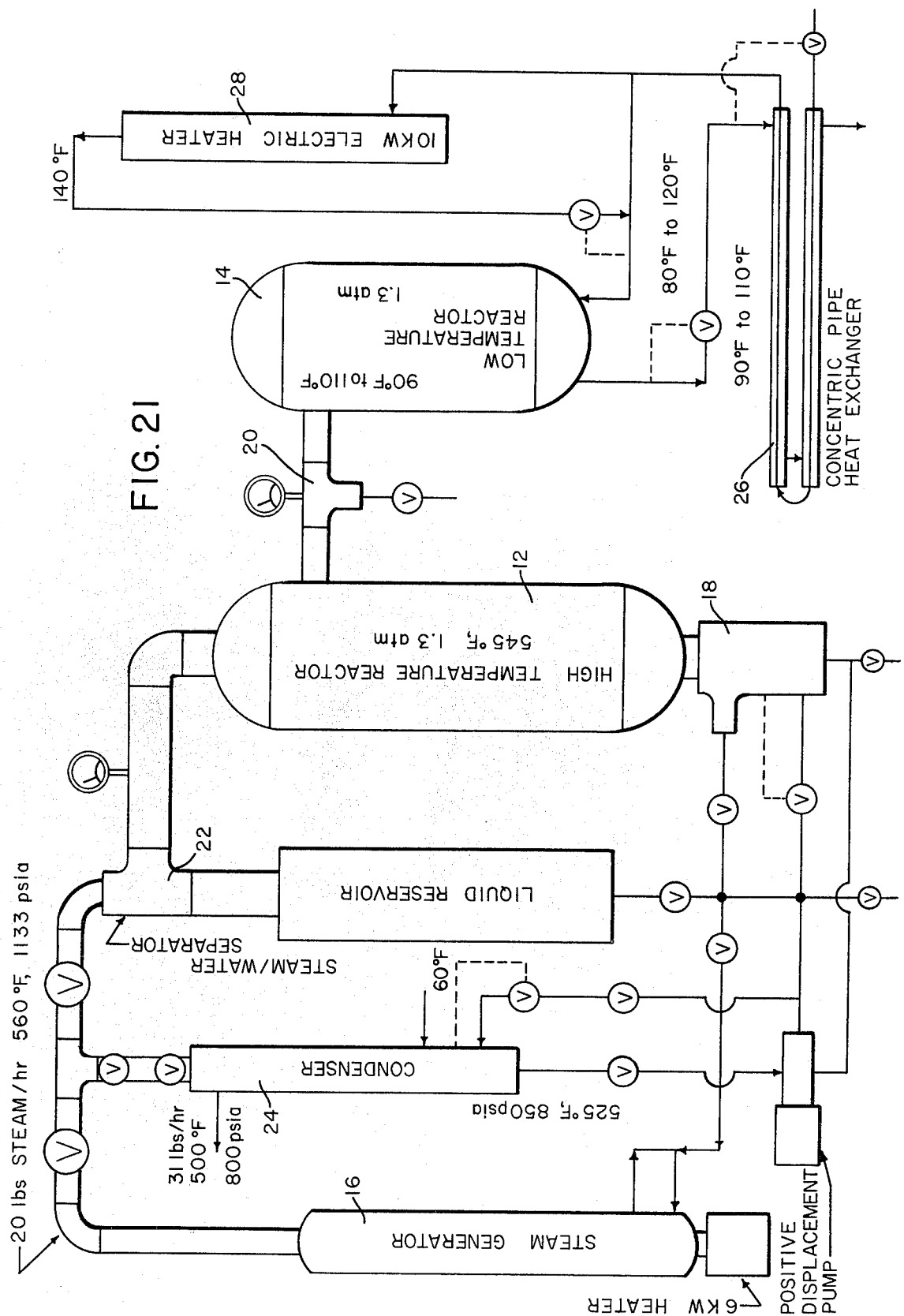

b. START OF DISCHARGE MODE

CHEMICAL STORAGE OF ENERGY

This application is a continuation-in-part application of U.S. Ser. No. 702,838 filed July 6, 1976 now abandoned.

Energy storage systems used heretofore usually store the energy as sensible heat at elevated temperatures. Because the storage systems usually comprise rock or water these methods suffer from thermal losses so that only a partial recovery of the stored energy can be made. This situation is aggravated when the energy source is intermittent, since auxiliary heating must be supplied almost immediately. If the energy can be stored at ambient temperatures then normal losses are minimized and storage can be maintained indefinitely. By recovering the energy stored at ambient temperature a high degree of efficiency can be accomplished.

The prior art U.S. Pat. No. 3,075,361 discloses a heat transfer system wherein solar heat is employed to endothermically dissociate a liquid hydride into a liquid metal and gaseous hydrogen wherein the dissociated hydride products are transferred to a storage vessel (heat sink) to recombine exothermically. The hydride to metal-gas and return is repeated over and over in the heat cycle.

IN THE DRAWINGS

FIG. 21 is a schematic diagram of a pilot scale storage system according to the present invention;

Figure 1:
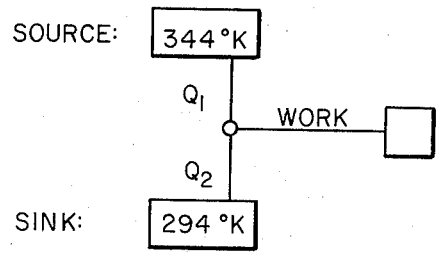
FIG. 1 is a block diagram that illustrates the operation of the present invention relative to the theoretical Carnot cycle performance.

The present invention is directed to any cyclic energy system which receives energy at a high temperature, stores it at a low temperature, and recovers the energy on demand near the temperature at which the energy was received. This may be a solar energy system, nuclear power plant or the like. The energy storage and recovery systems of the present invention are passive and have no moving parts in the usual sense. The only electrical energy required is for the pumps which circulate an exchange fluid through the energy collector and through the space to be heat conditioned.

A heating system according to the present invention comprises the storage and abstraction of heats of reaction of chemical systems near equilibrium. The preferred chemical systems are ammoniated chemical systems, such as salts, but the invention is not to be construed as being limited thereto. Alcoholates and hydrates, as well as salts of ethers and ketones, may also be used.

For most efficient operation it is preferred to select two salt systems that have essentially the same equilibrium vapor pressures at two different temperatures. Then by a slight change in temperature the equilibrium can be shifted to either recombine or dissociate a reaction product from the salt, as desired, and thereby utilize the heat of reaction in a storage or release mode. This energy storage system could have a role in providing energy to a peaking turbine, a variable bleed turbine or a primary turbine. Energy source, used to charge this storage system could be nuclear generators, conventional fuels or solar energy collectors. Other uses are envisioned for residential energy storage and to store and recover waste heat from an industrial complex.

The method of the present invention provides the chemical equivalent of a Carnot heat-pump cycle in that high temperature thermal energy is reversibly stored partially in the form of chemical energy and partially in the form of thermal energy at a lower temperature. Then, on demand, the stored energy, both chemical and thermal, is recovered as thermal energy at the original elevated temperature. The method of the present invention has the advantage of passively operating a reversible thermal cycle without the usual attendant irreversibilities associated with rotating machinery. The net changes in stored chemical energy during the cycle are equivalent to the work interchanged in a mechanical heat engine-pump cycle. By storing the thermal energy at or near ambient temperature, thermal storage losses can be reduced to negligible values.

The novel method of this invention is based on the following key features:

(1) High temperature thermal energy is used to decompose a solid compound such as an ammoniated salt and the like at an elevated temperature in a reaction cell 20.

(2) The gas evolved, which may be for example ammonia, is reacted with another solid at a lower temperature in a separate storage vessel 10 to form a solid compound, for example, an ammoniated salt. The heat generated by this second reaction may be stored in a phase change material, such as lithium nitrate trihydrate or other suitable thermal storage means such as a large body of water and the like, at near ambient temperature. The high temperature reaction and the low temperature reaction must be paired so that the vapor pressure of the fluid reactant, i.e., ammonia, at the lower temperature is essentially equal to the vapor pressure of the fluid reactant, i.e., ammonia, in the reaction cell 20 at the elevated temperature. The selection of the particular reaction pair is dependent upon the source and sink temperatures desired.

(3) Upon demand, the process can be reversed by lowering the reaction cell 20 temperature with a coolant fluid to a value slightly below the original decomposition temperature. When the reaction-cell pressure drops below the storage vessel or low temperature cell pressure, the gaseous reactant can be transferred back to the reaction-cell. During the process, the stored salt in the storage vessel 10 decomposes and recovers the stored, low temperature thermal energy. The vapor reacts in the reaction cell 20 and generates heat at an elevated temperature. This heat of reaction is transferred to the coolant fluid at a temperature only slightly less than the original temperature at which the thermal energy was added to the system.

The only inherent irreversibility peculiar to this cycle is, in effect, a net irreversible transfer of thermal energy from the source to the sink temperatures. This sensible heat degradation can be eliminated by the use of a regenerative exchanger. In addition, this cycle also shares the usual heat transfer irreversibilities in common with all real thermal cycles.

The example set forth in FIG. 1 illustrates the operation of the cycle relative to the theoretical Carnot cycle performance.

Basis:
Source temperature = 344° K. (160° F.)
Storage (Sink) temperature = 294° K. (70° F.)

$$Q_2/Q_1 \geq T_2/T_1 = 294/344 = 0.855 \quad \text{Equation (1)}$$

The temperature ratio of Equation (1) represents the minimum fraction of thermal energy available at 344° K. which must be stored at 294° K.

Figure 2:
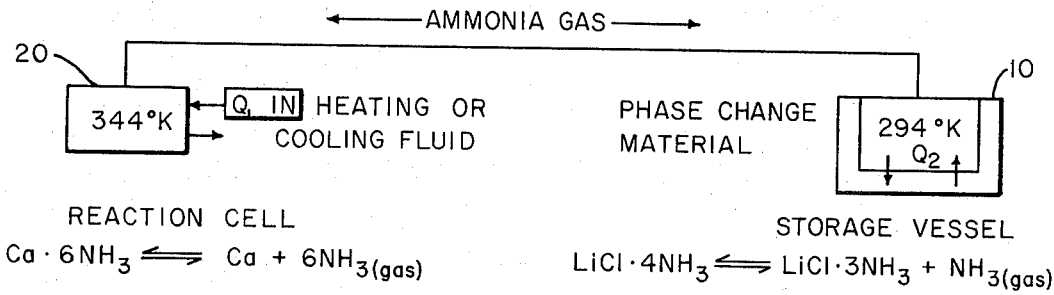
FIG. 2 is a diagrammatic representation of the chemical cycle in the Carnot cycle format.

Equations (2) and (3) depict the reactions for one system as set forth in FIG. 2 of the drawing.

REACTION CELL $$Ca \cdot 6NH_3 \rightleftharpoons Ca + 6NH_3 \uparrow \quad \text{Equation (2)}$$

STORAGE VESSEL $$LiCl \cdot 4NH_3 \rightleftharpoons LiCl \cdot 3NH_3 + NH_3 \quad \text{Equation (3)}$$

The following data is from International Critical Tables, McGraw-Hill, New York, Vol. 7, page 224, 1930.

TABLE I

| Reaction Cell | | | Storage Vessel | | |
|---|---|---|---|---|---|
| T °K | P, atm | ΔH, kcal/ gmole NH$_3$ | T °K. | P, atm | ΔH, kcal/ gmole of NH$_3$ |
| 344 | 1.4 | 10.3 | 294 | 1.4 | 8.8 |

It is essential that the heats of reaction be referred to the same vapor pressure. Equation (4) verifies that a versible chemical cycle is equivalent to a mechanical Carnot cycle operating between the same temperature limits—see Equation (1).

$$Q_2/Q_1 = \Delta H_2/\Delta H_1 = 8.8/10.3 = 0.855 \quad \text{Equation (4)}$$

Figure 3:
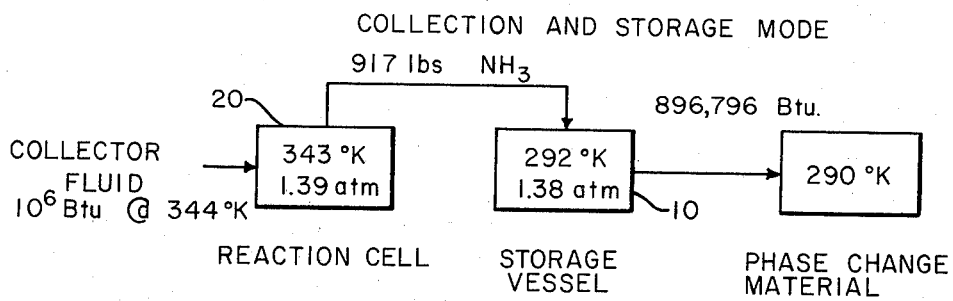
FIG. 3 is a representation of the collection and storage mode of the present invention using an ammoniated salt system.

This cycle can be applied to the storage of thermal energy obtained from a solar collector. For the purposes of illustration, reference is made to FIG. 3 which sets forth the collection and storage mode of a system according to the invention on the basis of a 10$^6$ Btu of thermal energy leaving the collector in a fluid at 344° K.

Table II is illustrative of the calculations required for the quantities of materials used for Equations (2) and (3).

TABLE II

Reactant requirements to absorb 10$^6$ Btu:
Equation (5)

$$\frac{10^6 \text{ Btu.}}{\left(10.3 \times 10^3 \frac{\text{cal}}{\text{gm mole}}\right)\left(1.8 \frac{\text{Btu gm}}{\text{cal lb}}\right)} = 53.94 \text{ lb moles NH}_3 \text{ generated}$$

Equation (6)

$$\left(53.94 \text{ lb} \frac{\text{moles}}{\text{gm}}\right)\left(17 \frac{\text{gm}}{\text{mole}}\right) = 917 \text{ lbs NH}_3 \text{ generated}$$

Equation (7)

$$\left(53.94 \text{ lb} \frac{\text{moles}}{\text{gm}}\right)\left(\frac{1 \text{ mole Ca}}{6 \text{ mole NH}_3}\right)\left(40 \frac{\text{gm}}{\text{mole}} \text{ Ca}\right) = 360 \text{ lbs of Ca.}$$

Total weight in reaction cell = 1277 lbs Ca · 6NH$_3$

Storage Requirements:
Equation (8)

$$\left(53.94 \text{ lb} \frac{\text{moles}}{\text{gm}}\right)\left(110.4 \frac{\text{gm}}{\text{moles}}\right) = 5955 \text{ lbs of LiCl · 4NH}_3$$

TABLE II-continued

Equation (9)

$$\frac{855,000 \text{ Btu}}{80 \text{ Btu/lb}} = 10688 \text{ lbs of phase change material with latent heat of fusion} = 80 \text{ Btu/lb at } 290° \text{ K}.$$

| | |
|---|---|
| Total weight in storage vessel | = 16,643 lbs |
| Sensible heat in NH$_3$ dissipated in storage = (53.94)(8.56)(1.8)(343 − 292) | = 42,386 Btu |
| reaction heat released = (53.94)(8.8 × 10$^3$)(1.8) | = 854,410 Btu |
| Total energy transferred to phase change | = 896,796 Btu |

Because the storage temperature of the example of Table II is selected near ambient, thermal losses are negligible.

Figure 4:
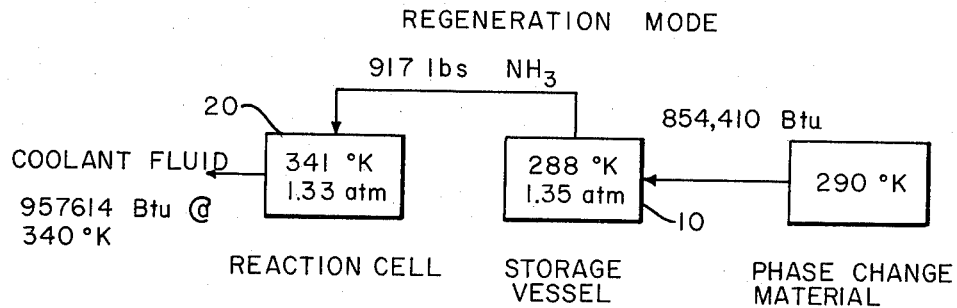
FIG. 4 is a representation of the regeneration mode.

Referring now to FIG. 4, there is illustrated the regeneration mode according to the present invention. This illustration indicates that out of the original 10$^6$ Btu of energy available at 344° K., 95.8% can be recovered at 340° K. and 4.2% is dissipated at 290° K. This cycle requires no external source of mechanical energy for its operation.

The materials chosen above are for illustration only. Other pairs may also be used with equal success. Choice of particular materials should be dependent on cost if all other factors are equal. The following should be considered in selecting a system.

1. The kinetics of the forward and reverse reactions of the salts;
2. Heat transfer rates; and,
3. Aging cycles of materials.

Space cooling may be carried out by a pair of systems according to the invention in which the reactions are alternatively run in the forward and reverse directions.

For power applications, the following pair of reactions, where equilibrium vapor pressures can be matched over a selected temperature range, are illustrative:

Source: Temperature range 775° K. to 845° K. (935° F. to 1060° F.)

$$2CuCl_2 \rightleftharpoons Cu_2Cl_2 + Cl_2 \quad \Delta H = 42.5 \text{ kcal/mole } Cl_2 \quad \text{Equation (10)}$$

Sink: Temperature range 277° K. to 300° K. (40° F. to 80° F.)

$$Cl_2.8H_2O \rightleftharpoons 8H_2O + Cl_2 \quad \Delta H = 17.96 \text{ kcal/mole } Cl_2 \quad \text{Equation (11)}$$

In this application only 36% of the collected energy is stored as thermal energy at ambient temperature.

Table III cites two representative experimental points on the vapor pressure curve of the reaction.

$$CaCl_2.8NH_3 \rightleftharpoons CaCl_2.4NH_3 + 4NH_3 \quad \text{Equation (12)}$$

The pressures listed are slightly higher than current values cited in the literature.

Table IV cites two representative experimental points on the vapor pressure curve of the reaction.

$$FeCl_2.6NH_3 \rightleftharpoons FeCl_2.2NH_3 + 4NH_3 \quad \text{Equation (13)}$$

The pressures listed are somewhat higher than current values cited in the literature.

Table V lists the ammonia evolution rate (mass of ammonia per hour per mass of available ammonia) as a function of temperature at a constant pressure of 760 torr for the reaction.

$$CaCl_2.8NH_3 \rightleftharpoons CaCl_2.4NH_3 + 4NH_3 \quad \text{Equation (12)}$$

The equilibrium temperature at this pressure is 29° C. The data indicates that the ammonia evolution rate is a function of temperature deviation from equilibrium. Additional data indicates that the process is reversible, i.e., CaCl$_2$.4NH$_3$ absorbs NH$_3$ at a rate that is a function of the temperature (29° C.) in the temperature range below the equilibrium temperature.

TABLE III

Equilibrium vapor pressure data obtained for reaction Equation (12) CaCl$_2$ . 8NH$_3$ ⇌ CaCl$_2$ . 4NH$_3$ + 4NH$_3$

| Temperature, °C. | Pressure, Torr |
|---|---|
| 29 | 760 |
| 19 | 450 |

TABLE IV

Equilibrium vapor pressure data obtained for reaction Equation (13) FeCl$_2$ . 6NH$_3$ ⇌ FeCl$_2$ . 2NH$_3$ + 4NH$_3$

| Temperature, °C. | Pressure, Torr |
|---|---|
| 245 | 750 |
| 231 | 450 |

TABLE V

Ammonia evolution rates for the reaction Equation (12) CaCl$_2$ . 8NH$_3$ ⇌ CaCl$_2$ . 4NH$_3$ + 4NH$_3$ vs. temperature (P = 760 Torr)

| Temperature, °C. | Rate of NH$_3$ Evolution, lbs/hr - lb available NH$_3$ |
|---|---|
| 29.0 | 0 |
| 32.2 | .05 |
| 33.8 | .34 |
| 36.0 | .84 |
| 38.5 | 1.45 |

The following reactions were carried out under laboratory conditions to substantiate the operation of the reaction mechanism.

$$\frac{\text{Cold}}{CaCl_2} \quad \text{Equation (14)}$$

(calcium chloride)

$$NH_3 \updownarrow$$

$$\frac{\text{Hot}}{FeCl_2}$$

(ferrous chloride)

The cold reaction is:

   Equation (12)

The hot reaction is:

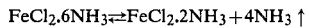   Equation (13)

Heat was first applied to the "hot" side and ammonia gas was transferred to the cold side, then to reverse the process, the temperature of the "hot" side was lowered and the calcium chloride ammoniate decomposed endothermally, evolving ammonia which was transferred to the hot side and reacted exothermally with the ferrous chloride ammoniate. The weight change in the reaction vessels was used as a measure of ammonia transfer.

Temperature and weight measurements made during ammonia transfer reactions confirmed the process.

In a further experiment, the following ten ammoniated metal salt reactions were evaluated.

| | Calcium Salts |
|---|---|
| Equation (12) | $CaCl_2 \cdot 8NH_3 \rightleftharpoons CaCl_2 \cdot 4NH_3 + 4NH_3$ |
| Equation (15) | $CaCl_2 \cdot 4NH_3 \rightleftharpoons CaCl_2 \cdot 2NH_3 + 2NH_3$ |
| Equation (16) | $CaCl_2 \cdot 2NH_3 \rightleftharpoons CaCl_2 \cdot NH_3 + NH_3$ |
| Equation (17) | $CaCl_2 \cdot NH_3 \rightleftharpoons CaCl_2 + NH_3$ |
| | Ferrous Salts |
| Equation (13) | $FeCl_2 \cdot 6NH_3 \rightleftharpoons FeCl_2 \cdot 2NH_3 + 4NH_3$ |
| Equation (18) | $FeCl_2 \cdot 2NH_3 \rightleftharpoons FeCl_2 \cdot NH_3 + NH_3$ |
| Equation (19) | $FeCl_2 \cdot NH_3 \rightleftharpoons FeCl_2 + NH_3$ |
| | Magnesium Salts |
| Equation (20) | $MgCl_2 \cdot 6NH_3 \rightleftharpoons MgCl_2 \cdot 2NH_3 + 4NH_3$ |
| Equation (21) | $MgCl_2 \cdot 2NH_3 \rightleftharpoons MgCl_2 \cdot NH_3 + NH_3$ |
| Equation (22) | $MgCl_2 \cdot NH_3 \rightleftharpoons MgCl_2 + NH_3$ |

Measurements of rates of dissociation and recombination were obtained for the first nine salts while heats of reaction were measured for all of the calcium and magnesium salts.

All of the calcium chloride ammoniates reacted both reversibly and reproducibly with quite low recombination rates obtained for reactions of Equations (16) and (17) at 760 torr. A large volume expansion accompanied the formation of all of the salts when ammoniates were formed from the anhydrous salts.

Electrical steam power systems may be classified according to the type of fuel used into three catagories; nuclear, fossil fueled, and solar powered systems. Under each of these classifications the power system may use thermal energy from a storage system to preheat feedwater, generate steam for direct turbine drive, and reheat steam between turbine stages. The nominal temperatures and pressures required for each of these applications are given in Table VI.

TABLE VI

| Required Storage Steam Conditions | | | |
|---|---|---|---|
| | Superheat, °F. | Saturated, °F. | psia |
| Feedwater Preheat | — | 450 | 423 |
| Turbine Inlet Steam | | | |
| Nuclear, Fossil | 1000 | 665 | 2400 |
| Solar | 950 | 570 | 1250 |
| Turbine Interstage Reheat | 1000 | 495 | 650 |

The inlet steam temperatures and pressures for a solar powered turbine are presently somewhat lower than the conditions for nuclear and fossil fired steam turbines in order to permit the thinner wall construction required for cyclic operations. However, the development of suitable storage systems would allow continuous operation of solar power systems and permit the use of higher inlet temperatures and pressures which would result in more efficient turbine operation.

At the present time, an ammoniated salt storage system of the present invention can accept and regenerate thermal energy up to a temperature of about 700° F. which is near the upper temperature limitation of the selected ammoniated salts. As such, it could be used to supply saturated steam at 450° F. for feedwater preheat and to store the latent heat of a main steam cycle operating up to 2400 psia. Upon regeneration, an auxiliary superheating technique would be required to raise the steam temperature from the saturation temperature (e.g., 665° F., 2400 psia) to the desired turbine inlet temperature (e.g., 1000° F., 2400 psia). An ammoniated salt storage system could also be used to supply thermal energy to reheat superheated steam from 500° F. to 650° F. at 650 psia. If desired, an auxiliary superheating system could be used to complete the reheat from 650° F. to 1000° F. at 650 psia.

Figure 5:
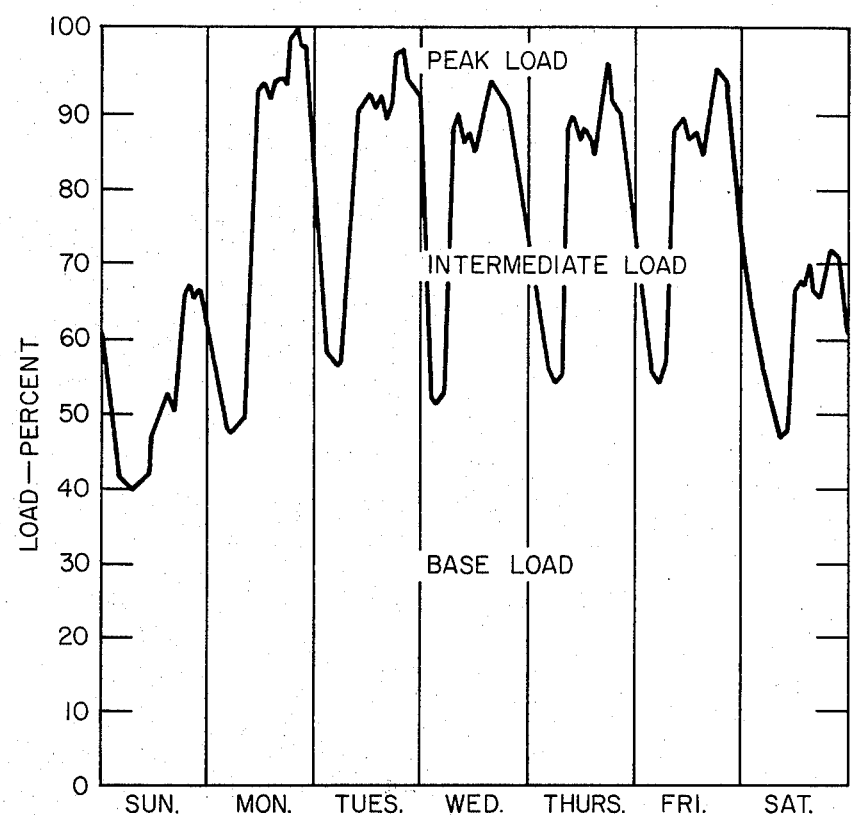
FIG. 5 is a graphical representation of a typical power plant weekly load.
Figure 6:
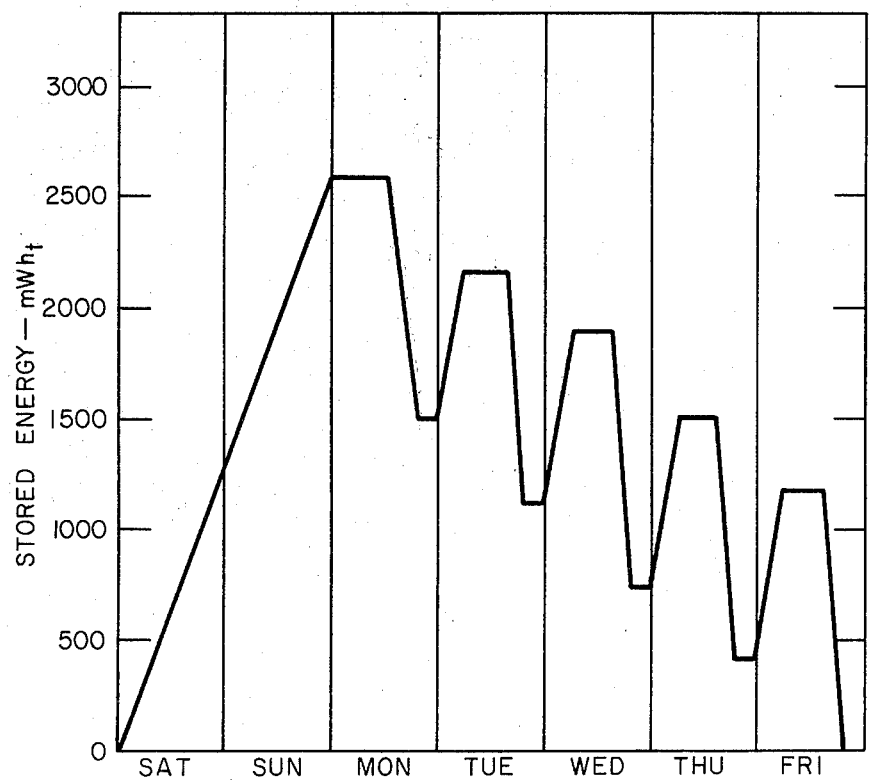
FIG. 6 is a graphical representation of a weekly energy storage cycle.

A technical evaluation of the ammoniated salt storage system is based on the assumptions listed in Table VI. A modular cylindrical container 10 ft. in diameter, 40 ft. long was selected because this is the maximum size vessel which can be conveniently prefabricated and transported to the site. For nuclear and fossil fueled plants, the quantity of energy to be stored is based on a 500 MWe power system. Based on a 70% average load factor (350 MWe base load), the system could generate an additional 30% of rated capacity (150 MWe) as off-peak power if the boilers were operated continuously at full load. Analysis of the typical load curve of FIG. 5 indicates that about 45% of the potential off-peak power occurs on Saturday and Sunday of each week, which agrees with the data in Casazza, J. A., et al, Energy Storage presented at 3rd Energy Conference, Washington, D.C., March 1976. It is indicated therein that it is desirable to store 20% of the peak load, assuming a peaking duty and a weekly cycle. The typical hours of on-peaking operation are 250 to 1000 annually, or 5 to 20 hours per week, according to this reference data. FIG. 6 shows a typical energy storage and withdrawal weekly cycle. Note that the storage system is sized for weekend storage, with the maximum volume required Monday morning. Storage is also replenished daily during the low consumption hours.

It was concluded that the storage system should be capable of operating on a weekly cycle and should have the capability of accepting 45% to 20% of the rated capacity for a discharge period of 5 to 20 hours per week during a 48 hour weekend period.

TABLE VII

Assumptions For Technical Evaluation Of Nuclear And Fossil Fueled Plants

1. Modular Container = 10-ft diameter, 40-ft long.
2. Salt Volume = 80% of total container volume.
3. Energy storage quantity = 45% of 20% of 500 MWe for 20 hours = 900 × 10³ KWHe.
4. Storage period = 1 week.
5. Discharge rate = 20% of 500 MWe or 100 × 10³ KWe.
6. Power cycle efficiency = 0.35 KWe/KWt.
7. Particle bed density = 30 lb/cu. ft.
8. Heat transfer coefficient (U) = 5 Btu/hr-ft²-°F.
9. Temperature difference between particle and heat transfer surfaces (Δt) = 15° F.

$U\Delta t = (5)$
$(15) = 75$ Btu/hr-ft²

TABLE VIII

Salt And Container Requirements For Nuclear And Fossil Fueled Plants

| | Temp. Range, °F. | Btu/lb | Lb/Tank | KWHt/Tank | KWHe/Tank | No. of Tanks |
|---|---|---|---|---|---|---|
| $FeCl_2 \cdot NH_3$ | 620–700 | 318 | 75,398 | 7025 | 2459 | 370 |
| $FeCl_2 \cdot 2NH_3$ | 441–530 | 259 | 75,398 | 5722 | 2003 | 450 |
| $CaCl_2 \cdot 8NH_3$ | 35–89 | 638 | 75,398 | — | — | 100 |
| $MgCl_2 \cdot NH_3$ | 570–700 | 393 | 75,398 | 8682 | 3039 | 296 |
| $MgCl_2 \cdot 2NH_3$ | 410–525 | 338 | 75,398 | 7467 | 2613 | 344 |

Because the ammoniated salt system accepts and generates thermal energy rather than electrical or mechanical energy, a 35% thermal cycle efficiency was assumed. Therefore, the total storage capacity becomes: (500 MWe)(0.20)(0.45)(20 hours)/0.35=2600 MWHt for 20 hours of on-peak discharge, or 650 MWHt for 5 hours discharge per week.

The storage volume was based on an assumed bed density of 30 lb/cu. ft. and a salt volume equal to 80% of container volume. The heat transfer area was based on a predicted heat transfer coefficient between the salt particle and the heat transfer surface of 5 Btu/hr-ft$^2$-°F. and a selected temperature difference of 15° F. The heat transfer coefficient is based on a heat exchanger constructed of ½ inch tubes on 1 inch centers in a fixed particle bed.

Based on the assumptions summarized in Table VII, the salt masses, stored energy and number of containers for each salt were determined and the results summarized in Table VIII. Sample calculations are indicated below for $FeCl_2$ in a fixed particle bed.

1. Salt mass per container=$(10^2 \pi/4)(40)(0.8)(30)$=75,398 lb.

2. For a heat of reaction of 318 Btu/lb. of $FeCl_2$, thermal energy stored per container=$(75,398)(318)$=23.977×10$^6$ Btu, or 23.977×10$^6$/3413=7025 KWHt or (7025)(0.35)=2459 KWHe.

3. For 2600 MWHt of storage capacity, number of containers=2600×10$^3$/7025=370.

4. Required heat transfer area for $FeCl_2$: (285.7×10$^3$ KWt)(3413)/(5)(15)=13.0×10$^6$ ft.$^2$, or 13.0×10$^6$/370=35.1×10$^3$ ft.$^2$ per container of $FeCl_2$, or 35.1×10$^3$/1000=11.2 ft.$^2$/ft.$^3$ of container volume, or 13.0×10$^6$/100×10$^3$=130 ft.$^2$/KWe.

Because the low temperature $CaCl_2$ reaction absorbs (or produces) four times the amount of ammonia that the high temperature $FeCl_2$ reaction produces (or absorbs), the mass and volume of $CaCl_2$ is (111/127)/4=0.219 times the corresponding value of $FeCl_2$. Also, the quantity of heat transferred in the $CaCl_2$ reactions is about one-half that transferred in the $FeCl_2$ reactions. Because the number of $CaCl_2$ containers is roughly one-fourth the number of $FeCl_2$ containers and the quantity of heat transferred is roughly one-half, the heat transfer area per $CaCl_2$ container should be roughly (½)(¼) or twice the heat transfer area for a $FeCl_2$ container or about 70,000 ft.$^2$ (22 ft.$^2$/ft.$^3$ of container volume).

A heat exchanger constructed of ½ inch diameter tubes on 1 inch centers will provide an available heat exchange area of 19.2 ft.$^2$ per ft.$^3$ of tank volume. Because the high temperature ($FeCl_2$ and $MgCl_2$) reaction requires a heat transfer area of about 11 ft.$^2$ per ft.$^3$, this simple heat exchanger construction will be adequate. Because the low temperature ($CaCl_2$) reaction requires about 22 ft.$^2$ per ft.$^3$ of heat transfer area, either the low temperature heat exchanger area or the mean temperature difference must be increased to match this requirement.

Economic evaluation shows that heat exchanger costs contribute a major portion of the total storage cost. Therefore, it is economically desirable to minimize heat exchanger area by exploring operational techniques other than the fixed particle bed. An alternate technique to a fixed bed is the fluidized bed. This technique has the advantage of isothermal bed temperature, improved heat transfer rate and continuous agitation to break up coagulated particles. It has the disadvantage of requiring gas/particle separation equipment (e.g., cyclones and microfilters) at the gas outlet, attrition of particle size and blower power for gas circulation and fluidization of solids.

Two important parameters required for fluidized bed design are the minimum gas velocity required for fluidization and a heat transfer coefficient. The correlation of Miller and Logwinuk (Ind. Eng. Chem., Vol. 43, p. 1220–1226, 1951) can be used to estimate the minimum gas mass velocity for fluidization.

$$G_{min} = D_p^2 (\rho_s - \rho_v)^{0.9} \rho_v^{1.1} \, g/800\mu \quad \text{Equation (24)}$$

where:
$G_{min}$=minimum gas mass velocity, lb/sec-ft.$^2$
$D_p$=particle size=(0.0029/12) feet
$\rho_s$=solid density=(2.5)(62.4)=156 lb/ft.$^3$
$\rho_v$=gas density=(17)/(0.73)(580)=0.0402 lb/ft.$^3$ at 120° F. and 1 atmosphere
g=acceleration of gravity=32.2 ft/sec$^2$
$\mu$=gas viscosity=(0.02)(2.42)/3600 lb/ft-sec From the correlation, $$G_{min} = 4.80 \times 10^{-4} \, \text{lb/sec-ft.}^2$$

For a 10-ft. diameter tank, $$GA = (4.80 \times 10^{-4} \, \text{lb/sec-ft.}^2)(25 \pi \, \text{ft.}^2) = 0.0377 \, \text{lb/sec}$$

where
A=area, ft.$^2$
For the reaction $FeCl_2 \cdot NH_3 \rightarrow FeCl_2 + NH_3$, the ammonia evolution rate is: (35,168 ft.$^2$)(75 Btu/hr-ft.$^2$)(17 lb $NH_3$/mole)/(318 Btu/lb of $FeCl_2$)(127 lb $FeCl_2$/mole)=1110 lb $NH_3$/hr or 0.31 lb $NH_3$/sec in a 10-ft. diameter tank This indicates that the ammonia evolution rate during discharge is more than sufficient to self-fluidize a 200 mesh particle bed of $FeCl_2$. The corresponding ammonia evolution rate in a $CaCl_2$ bed would be at least twice the above value.

Heat transfer coefficients in a fluidized bed may be estimated from the correlation of Wender and Copper (AIChE Journal, Vol. 4, p. 15, March 1958).

$$\frac{hD_p/k}{(1-\epsilon)} \left[ \frac{k}{\rho C} \right]_g^{0.43} = \quad \text{Equation (25)}$$

-continued $$0.033 C_R \left[\frac{D_p G}{\mu}\right]^{0.23} \left[\frac{C_s}{C_g}\right]^{0.8} \left[\frac{\rho_s}{\rho_g}\right]^{0.66}$$

where:
h = heat transfer coefficient, Btu/hr-ft.$^2$-°F.,
$D_p$ = particle diameter = 0.000242 ft.
k = gas thermal conductivity = 0.03 Btu/hr-ft.-°F.
$\epsilon$ = bed porosity = 0.5
$\rho_g$ = gas density = 0.0402 lb/ft.$^3$ at 120° F., 1 atm
$C_g$ = gas heat capacity = 8.8/17 = 0.518 Btu/lb-°F.
$C_R$ = empirical parameter = 1.6
G = gas mass velocity = 4.80 × 10$^{-4}$ lb/sec-ft.$^2$
$\mu$ = gas viscosity = (0.02)(2.421/3600) lb/ft.-sec
$C_s$ = solid heat capacity = 0.163 Btu/lb-°F.
$\rho_s$ = solid density = 156 lb/ft.$^3$ The 0.033 constant has dimensions of ft.$^2$/hr From the correlation, h = 87 Btu/hr-ft.$^2$-°F. This value of the heat transfer coefficient indicates that the heat transfer rate in a fluidized bed is, at least, an order of magnitude higher than the rate in a fixed bed. This, in turn, suggests that the heat exchanger area could be reduced still further from the required area to not more than 5% of the fixed bed heat exchanger area. There appears to be sufficient economic incentive to consider a fluidized bed reactor. These results are summarized in Table IX.

TABLE IX

| Comparison of Fixed Bed and Fluidized Bed Heat Exchanger Areas | | |
|---|---|---|
| | Fixed Bed | Fluidized Bed |
| h, Btu/hr-ft.$^2$-°F. | 5 | 87 |
| $\Delta$t, °F. | 15 | 7.5 |
| Heat Exchanger Area, ft.$^2$/ft.$^3$ | 19.2 | 1.0 |

The storage requirements for a solar powered electrical system are sufficiently different from nuclear and fossil fueled plants to warrant a separate evaluation. The basis of the evaluation is summarized in Table X. The salt and container requirements are summarized in Table XI.

TABLE X

Assumptions for Technical Evaluation of Solar Powered System

1. Modular Container: 10 ft. diameter, 40 ft. long
2. Salt Volume: 80% of total container volume
3. Energy storage quantity - 100 MWe for 18 hours = 1800 × 10$^3$ KWHe.
4. Storage period. 24 hours
5. Charge rate: 300 MWe
6. Power cycle efficiency: 0.35 KWe/KWt
7. Particle bed density: 30 lb/cu. ft.
8. Heat transfer coefficient = 5 Btu/hr-ft-°F. for fixed bed reactor (U)
9. Temperature difference betw3en particle and heat transfer surface ($\Delta$t) = 15° F.

The energy storage system was assumed to have the capability of producing 100 MWe of power over an 18 hour period. Therefore, the storage capacity would be 1800 MWHe or 5143 MWHt based on a 35% conversion efficiency. However, this energy must be collected in a six hour period at a rate of 5143/6 = 857 MWt or 300 MWe. Because the storage system of a solar powered plant is used exclusively to supply turbine drive steam at 1250 psia, the thermochemical reactions will accept and regenerate the latent heat at 570° F. Therefore, only the reaction $MgCl_2.NH_3 \rightarrow MgCl_2 + NH_3$ need be considered for the high temperature storage reactor.

The fixed bed heat exchanger area is 19.2 ft.$^2$/ft.$^3$, and the required heat transfer area based on h = 5 Btu/Hr-ft.$^2$°F. and $\Delta$T = 15° F., for a 300 MWe rate is $(300 \times 10^3)(3413)/(0.35)(5)(15)(1000)(592) = 21$ ft.$^2$ per ft.$^3$. Therefore, the area required for a fixed bed reactor approximates the requirements for a 100 MWe solar power plant. However, a fluidized bed storage system offers the possibility of reducing the required area by a factor of 10 to about 1.5 or 2 ft.$^2$/ft.$^3$.

The selection of salt reactions in accordance with the investigation is based in part on existing thermodynamic literature data of vapor pressure, temperature range and heat of reaction plus estimated specific cost. The heat of reaction, vapor pressure and temperature are related through the thermodynamic relation:

$$\ln(p_2/p_1) = (\Delta H/R)(T_2 - T_1)/T_2 T_1 \qquad \text{Equation (27)}$$

where $\Delta$H is the heat of reaction per mole of NH$_3$.

A technical analysis indicated that the CaCl$_2$ reaction $CaCl_2.8NH_3 \rightarrow CaCl_2.4NH_3 + 4NH_3$ would be suitable for the near ambient temperature reaction at near ambient pressure with a heat of reaction of about 638 Btu/lb of CaCl$_2$. In addition, the salt is low in cost (about $0.05/lb) and readily available. Although a second reaction of $CaCl_2.4NH_3 \rightarrow CaCl_2.2NH_3 + 2NH_3$ occurs at a temperature about 20° F. higher than the low temperature reaction and two other CaCl$_2$-ammoniate reactions occur in the 400° F. to 500° F. temperature range, they were not considered for this particular test; however, they could be used to advantage in others.

Studies revealed that FeCl$_2$ should exhibit the reaction $FeCl_2.6NH_3 \rightarrow FeCl_2.2NH_3 + 4NH_3$ in the temperature range of 150° F. to 250° F. at near atmospheric pressure with a heat of reaction of about 700 Btu/lb of FeCl$_2$. This reaction would be of interest in building heating applications. A second reaction, $FeCl_2.2NH_3 \rightarrow FeCl_2.NH_3 + NH_3$ occurs in the temperature range of 441° F. to 530° F. and a third reaction, $FeCl_2.NH_3 \rightarrow FeCl_2 + NH_3$ occurs in the 620° F. to 700° F. temperature range. The latter two reactions are of interest in high temperature power plant applications. Although an exact cost is not available for anhydrous FeCl$_2$, it is indicated to be about $0.20/lb.

Further study revealed that reactions of MgCl$_2$ ammoniates have essentially the same thermodynamic properties of vapor pressure and molar heats of reac-

TABLE XI

| Salt and Container Requirements for a Solar Powered System | | | | | | |
|---|---|---|---|---|---|---|
| | Temp. Range, °F. | Btu/lb | Lb/Tank | KWt/Tank | KWHe/Tank | No. of Tanks |
| FeCl$_2$ . 2NH$_3$ | 441-530 | 259 | 75,398 | 5722 | 2003 | 900 |
| CaCl$_2$ . 8NH$_3$ | 35-89 | 638 | 75,398 | — | — | 197 |
| MgCl$_2$ . NH$_3$ | 570-700 | 393 | 75,398 | 8682 | 3039 | 592 | tions as FeCl$_2$ reactions in the high temperature region. MgCl$_2$ has a lower molecular weight than FeCl$_2$ (95 vs 127) which results in a higher energy change per unit mass. Also, MgCl$_2$ does not have the multiplicity of valence levels associated with FeCl$_2$. Preliminary information also indicates that it should cost less than FeCl$_2$ on a unit mass basis. For these reasons, MgCl$_2$ has been identified as a viable alternative to FeCl$_2$ in the high temperature applications.

Figure 7:
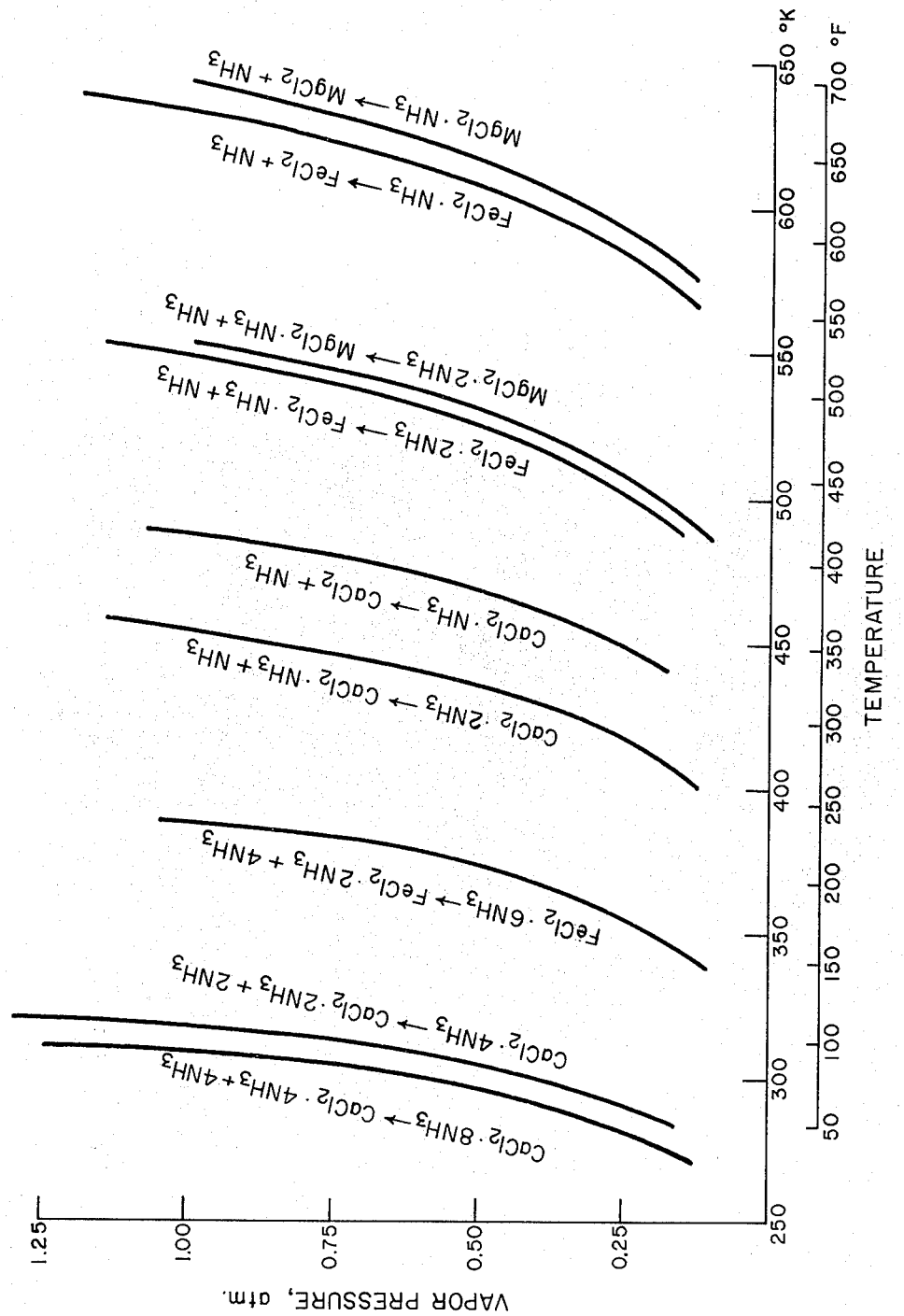
FIG. 7 is a graphical representation of the vapor pressure data for ammoniated salts of $FeCl_2$, $CaCl_2$ and $MgCl_2$.

The vapor pressure characteristics of nine ammoniated salts which appear to be worthy of investigation are summarized in FIG. 7.

Storage system costs are determined from the following linear equation (Casazza, J. A., et al, Energy Storage presented at 3rd Energy Conference, Washington, D.C. 1976):

$$C = C_p + C_s T \qquad \text{Equation (28)}$$

where
C = total installed capital cost ($/KW)
$C_p$ = cost of power related equipment ($/KW)
$C_s$ = cost of storage related equipment ($/KWH)
T = discharge time at rated capability (hours)

The capital costs (C) include both equipment and installation costs. The power related costs ($C_p$) are associated with the maximum power output for the storage system as well as the utility interface requirements. The storage related costs ($C_s$) are associated with the storage capacity for particular duty cycles.

With reference to the reversible chemical storage system, $C_p$ is primarily the cost of heat exchange area, and $C_s$ is primarily the cost of the salts and containers.

The heat exchanger costs are based on one-half inch tubes, 0.065 inch wall thickness which weight 0.329 lb per foot with an external surface area of 0.1309 ft.$^2$/ft. or 2.513 lb/ft.$^2$ of surface area. On the basis of the assumptions listed in Table VII, the required heat transfer surface is 3413/(0.35)(75) = 130 ft.$^2$/KWe. Therefore, the required heat transfer surface area for the entire system weighs (2.513)(130)(1.5) = 490 lb/KWe. The factor of 1.5 includes the CaCl$_2$ reactors in addition to the FeCl$_2$ reactors.

A fixed reactor system heat exchanger requires about two times this amount of area and a fluidized bed system heat exchanger requires about 10% of this area. Therefore, the heat transfer area weight (and cost) could range from 980 lb/KWe to 49 lb/KWe depending upon the type of operation selected. Assuming $1/lb for heat transfer surface, $C_p$ = $49/KWe for a fluidized bed and $980/KWe for a fixed bed operation.

Storage costs include both the salt costs and the container costs. These costs are summarized in Table XII.

TABLE XII

| | Salt and Container Costs | | |
|---|---|---|---|
| | lb/KWHe | $/lb | $/KWHe |
| FeCl$_2$ | 30.66 | 0.20 | 6.13 (MgCl$_2$ is similar) |
| CaCl$_2$ | 8.25 | 0.05 | 0.41 |
| NH$_3$ | 15.12 | 0.10 | 1.51 |
| Container | 6.67 | 1.00 | 6.67 |
| Total ($C_s$) | | | 14.73 |

Two additional factors which affect salt costs, but which cannot be quantified at this time, are worthy of discussion. It is noted that it is necessary to use anhydrous salts in order to prevent water from interfering with the repeatability of the process. This requirement will tend to raise the cost of the salts. However, it is also noted that the energy storage process uses very large quantities of salts. Production of large quantities of salts will tend to lower the unit salts cost, and thus tend to offset the affect of producing the anhydrous materials.

It is felt at this time that the cost factors will not jeopardize the usability of the process.

$$CaCl_2.8NH_3 \rightleftharpoons CaCl_2.4NH_3 + 4NH_3 \qquad \text{Equation (12)}$$

Figure 8:
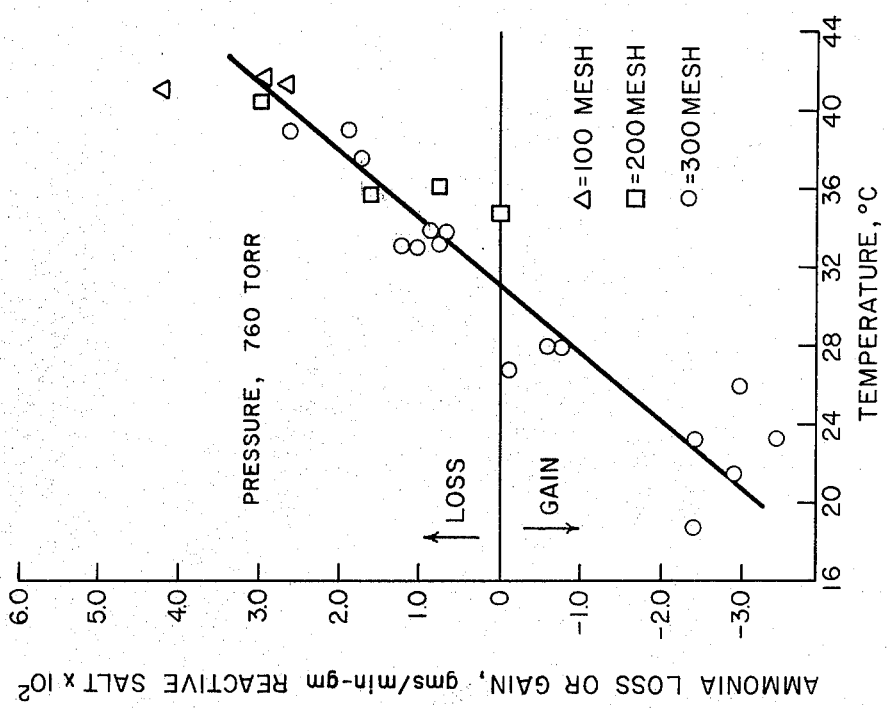
FIG. 8 is a graphical representation of the rate data for Equation (12)

The rates of dissociation and recombination for the salt system of Equation (12) at 760 torr are given in FIG. 8. Accompanying the initial formation of the octa-ammoniate, there is a free volume expansion of approximately three to four times that of the original salt.

Because of the large volume expansion that takes place when the ammoniation occurs in this salt, it was found that the measured rates of recombination and dissociation eventually become independent of original particle size. Although the initial rate of ammonia reaction with the salt may be particle size dependent, it appears that, for this salt and all others tested, the salt when ammoniated will attain a particle size independent of the starting particle size distribution. The rate data given in FIG. 8 indicate no dependency of the rates for 100, 200 or 400 mesh salt.

The temperature corresponding to the equilibrium vapor pressure of 760 torr is 31° C., compared to 32° C. for vapor pressure data obtained from the International Critical Tables.

The dissociation rates obtained for this salt were readily reproducible, independent of the number of prior cycles (up to 15) and independent of the degree of completion of the reaction. The dissociation rates could not be obtained beyond 41° C. because of possible interference by the tetra-diammoniate reaction.

The recombination data were considerably less reproducible than for the dissociation. This was due in part to the difficulty in obtaining subambient temperatures in the thermoanalyzer. Also, because the recombination is a bimolecular reaction, the rate was somewhat dependent on the degree of completion of the reaction.

The effects of ammonia pressure on the rates of recombination and dissociation were not obtained for this reaction because of maximum pressure (1 atm.) and minimum temperature (20° C.) limits of the apparatus.

$$CaCl_2.4NH_3 \rightleftharpoons CaCl_2.2NH_3 + 2NH_3 \qquad \text{Equation (15)}$$

Figure 9:
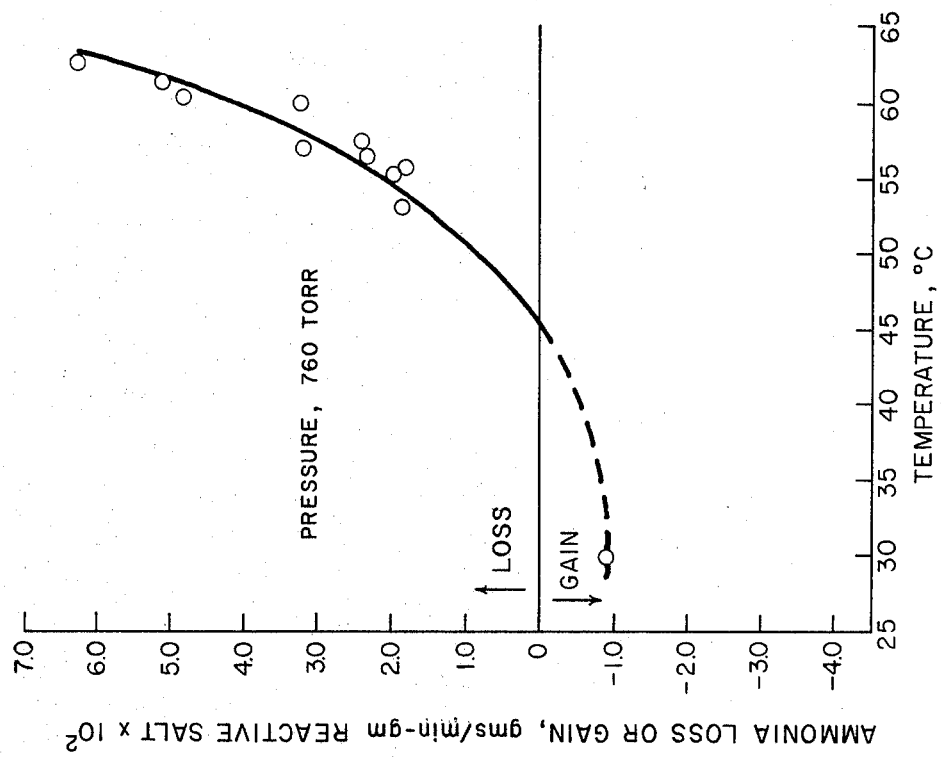
FIG. 9 is a graphical representation of the rate data for Equation (15)

The dissociation and recombination rates obtained for this reaction are given in FIG. 9.

For the dissociation, the rates obtained were reproducible with little or no influence by number of cycles (up to 11) or degree of completion of the reaction.

For the recombination reaction, only one point was obtained because of the narrow temperature region available without interference from the octa-tetra ammoniate reaction. Recombination rate dependence with temperature is therefore a matter of conjecture.

Equilibrium vapor pressure data obtained from the International Critical Tables indicates a vapor pressure of 760 torr at 42° C. while the data obtained experimentally indicates an equilibrium pressure of 760 torr occurring at approximately 46° C.

$$CaCl_2.2NH_3 \rightleftharpoons CaCl_2.NH_3 + NH_3 \qquad \text{Equation (16)}$$

Figure 10:
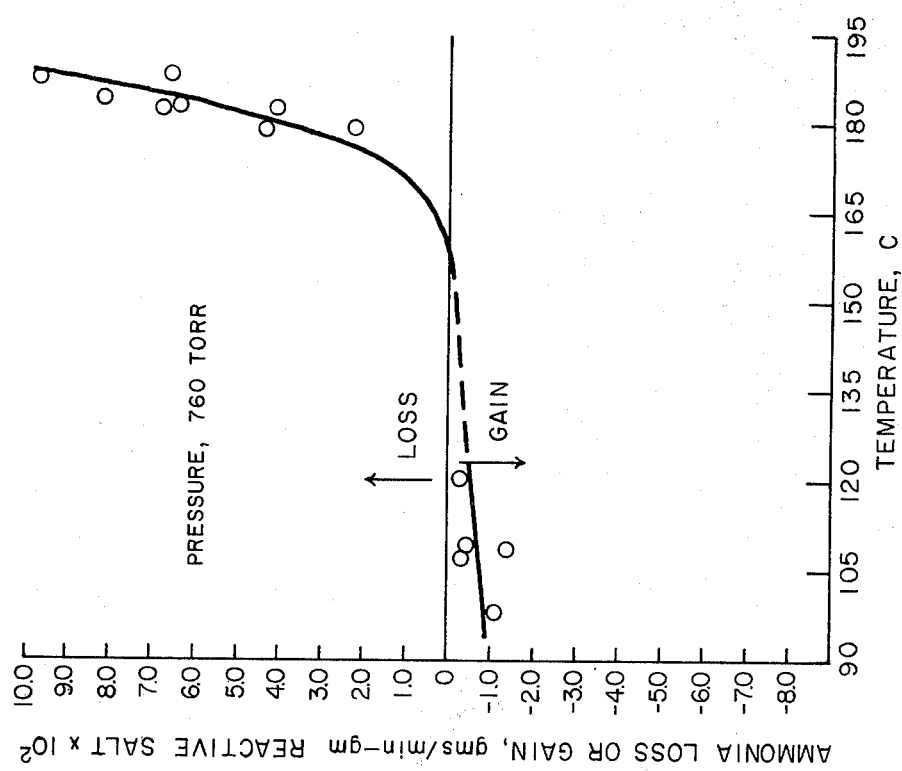
FIG. 10 is a graphical representation of the rate data for Equation (16)

This salt is characterized by a rather extremely poor recombination rate, FIG. 10, at 760 torr. From the estimated equilibrium temperature of 165° C. at 760 torr ammonia pressure, a drop in temperature of 40° C. was necessary to obtain measurable rates of recombination.

The dissociation rates are comparable to the rates for the higher salt ammoniates, based on the available ammonia for each reaction.

The equilibrium temperature for a vapor pressure of one atmosphere was determined to be approximately 165° C. compared to the literature value of 180° C.

$$CaCl_2.NH_3 \rightleftharpoons CaCl_2 + NH_3 \qquad \text{Equation (17)}$$

Figure 11:
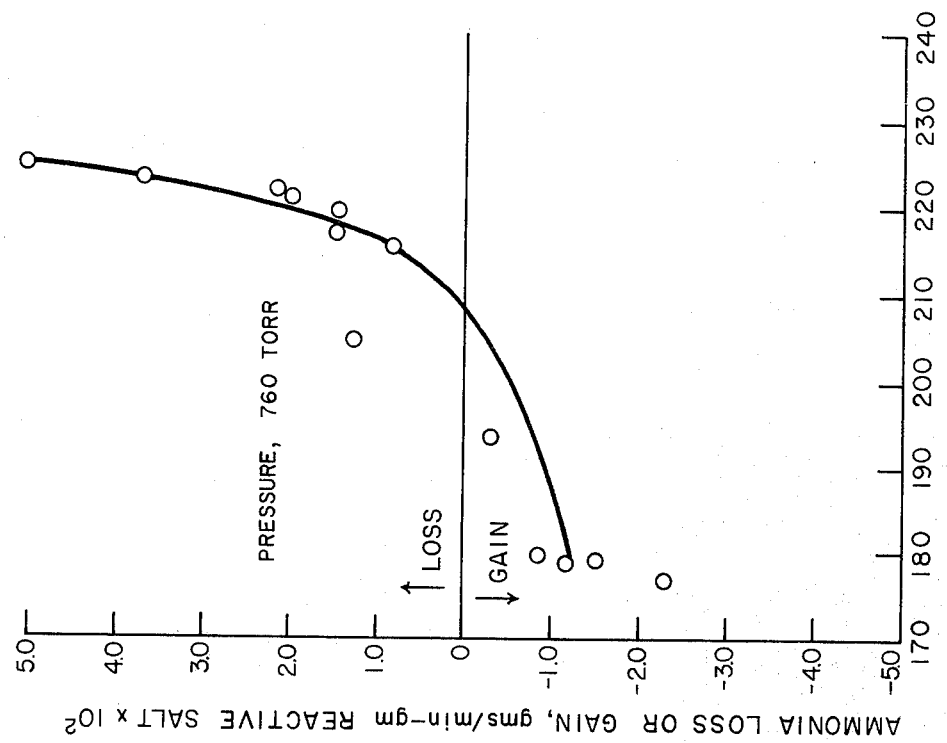
FIG. 11 is a graphical representation of the rate data for Equation (17)

The rate data obtained for this reaction at one atmosphere ammonia pressure are given in FIG. 11.

As with the previous reaction, this salt has a slow recombination rate at 760 torr.

The equilibrium temperature for an ammonia pressure of 760 torr over the salt was determined to be approximately 208° C. compared with the literature value of 211° C.

Samples of ferrous chloride used were obtained from three different sources. Initially, it was thought that the tetrahydrate, $FeCl_2.4H_2O$, could be vacuum baked to obtain the anhydrous ferrous chloride. Each time this material was heated in vacuum, there was a color change from blue/green to rust, with excessive amounts of weight loss (4 moles water) with a white residue collecting on cooler surfaces of the furnace when ammonia was added. It was initially thought that the platinum sample crucible may have been acting as a catalyst in promoting undesirable side reactions between the ferrous chloride and water. Such an example would be:

$$FeCl_2.4H_2O \rightleftharpoons FeOHCl + HCl + 3H_2O \qquad \text{Equation (35)}$$

$$NH_3 + HCl \rightarrow NH_4Cl \qquad \text{Equation (36)}$$

To eliminate the possibility of the catalytic reactions, an alumina crucible was substituted for the platinum. This had no effect on the salt discoloration or residue formation. The "anhydrous" salts exhibited the same behavior as the tetrahydrate, indicating the presence of enough moisture in both "anhydrous" materials to cause competing reactions with the ammoniate formation and dissociation. It is probable that these side reactions of ferrous chloride, moisture and ammonia were responsible for the inability to obtain reproducible rate data for the three ferrous chloride ammoniate reactions.

Figure 12:
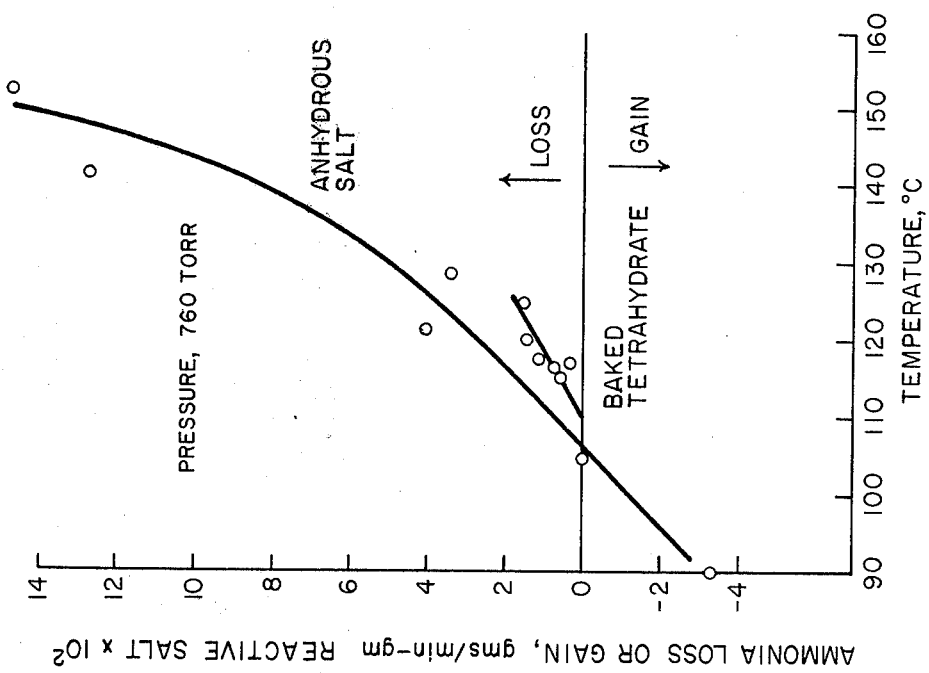
FIG. 12 is a graphical representation of the rate data for Equation (13)

FIG. 12 gives the rate data obtained for the following reaction.

$$FeCl_2.6NH_3 \rightleftharpoons FeCl_2.2NH_3 + 4NH_3 \qquad \text{Equation (13)}$$

Two dissociation rate curves are evident, one for tetrahydrate samples, another for "anhydrous" $FeCl_2$. No recombination of the $FeCl_2.2NH_3$ was evident at 760 torr until the temperature was lowered to approximately 40° C.

Figure 13:
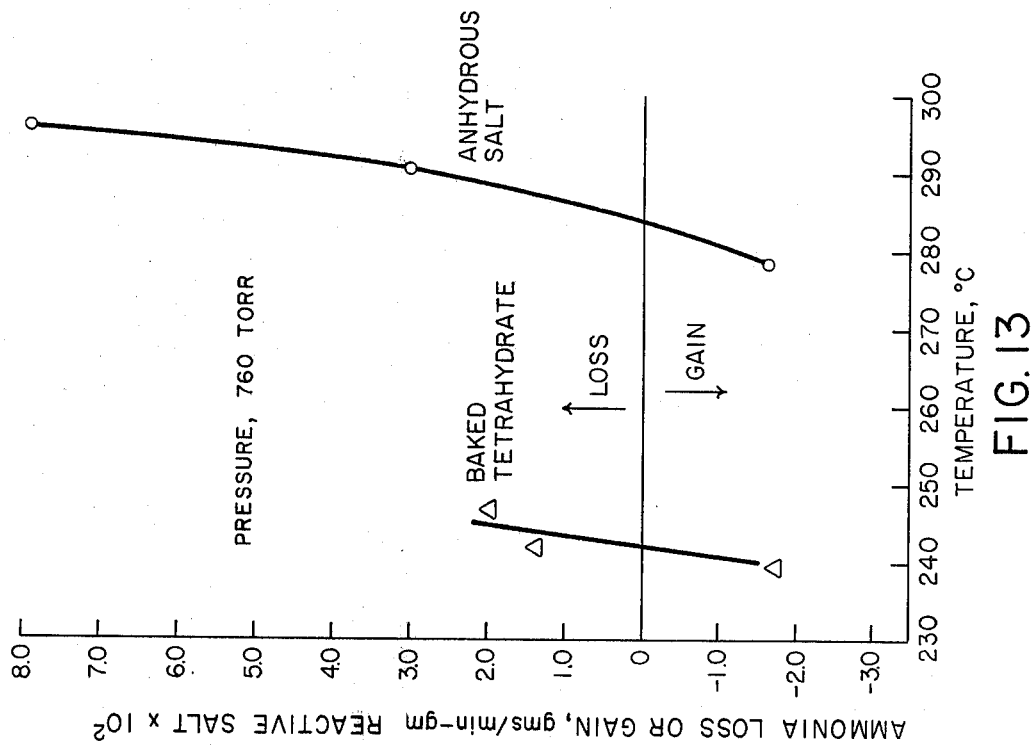
FIG. 13 is a graphical representation of the rate data for Equation (18)

FIG. 13 gives the best data obtained for the reaction $$FeCl_2.2NH_3 \rightleftharpoons FeCl_2.NH_3 + NH_3 \qquad \text{Equation (18)}$$

Again there is a wide discrepancy in the dissociation and recombination rates for the tetrahydrate salt and the "anhydrous" salts at 760 torr ammonia pressure.

The equilibrium temperatures at 760 torr are approximately 242° C. and 283° C. for the tetrahydrate and "anhydrous" salts, respectively. The literature value for this equilibrium temperature is given as 272° C.

Figure 14:
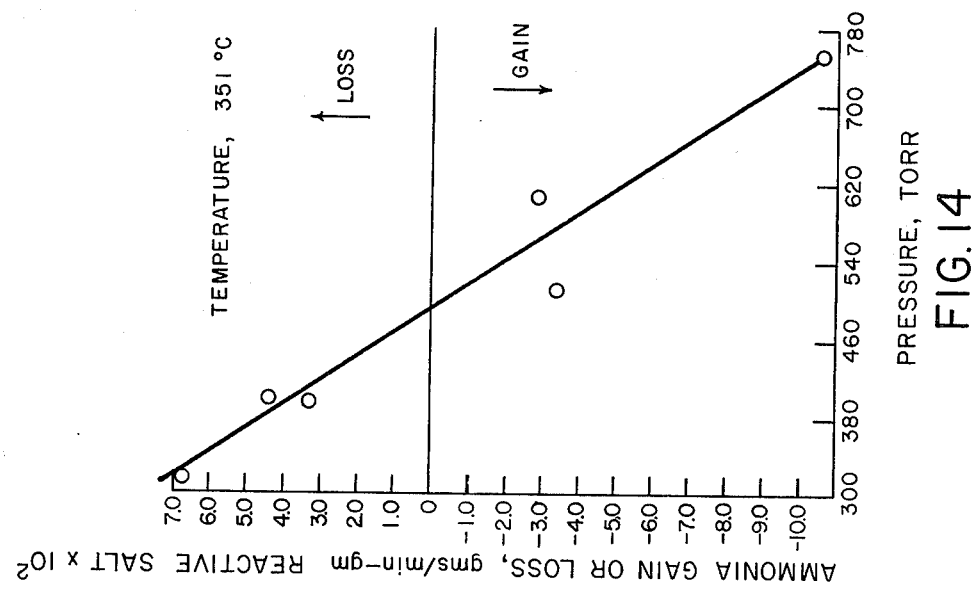
FIG. 14 is a graphical representation of the rate data for Equation (19)

For the reaction $$FeCl_2.NH_3 \rightleftharpoons FeCl_2 + NH_3 \qquad \text{Equation (19)}$$

the salt weight was changing at a significantly rapid rate, even when the $FeCl_2.NH_3$ dissociation was supposedly complete. For this reason, the dissociation and recombination rates were determined isothermally, at 351° C., with the pressure varied from 300 to 760 torr (FIG. 14). Testing was done in this manner because pressure changes could be made more rapidly than temperature changes.

The initial testing of the magnesium chloride ammoniates was performed on the hexahydrate which was vacuum baked to form the anhydrous salt. The salt ammoniate reaction $$MgCl_2.6NH_3 \rightleftharpoons MgCl_2.2NH_3 + 4NH_3 \qquad \text{Equation (20)}$$

rate data obtained with this salt was both reversible and reproducible. However, for the next two ammoniate reactions $$MgCl_2.2NH_3 \rightleftharpoons MgCl_2.NH_3 + NH_3 \qquad \text{Equation (21)}$$

and $$MgCl_2.2NH_3 \rightleftharpoons MgCl_2 + NH_3 \qquad \text{Equation (22)}$$

the salt began to exhibit a continuing permanent weight less proportional to the temperature and time of exposure. A white deposit was also collected on the furnace wall.

At this point, an "anhydrous" magnesium chloride, containing up to 2% water, was substituted for the hexahydrate salt. During vacuum baking of the salt, it was found that the salt lost approximately 10% of its original weight, most of this loss presumed to be water. Behavior of this salt during the two higher temperature ammoniate reactions was similar to that of the hexahydrate, with a continuing permanent weight loss and white deposits forming on the furnace.

Figure 15:
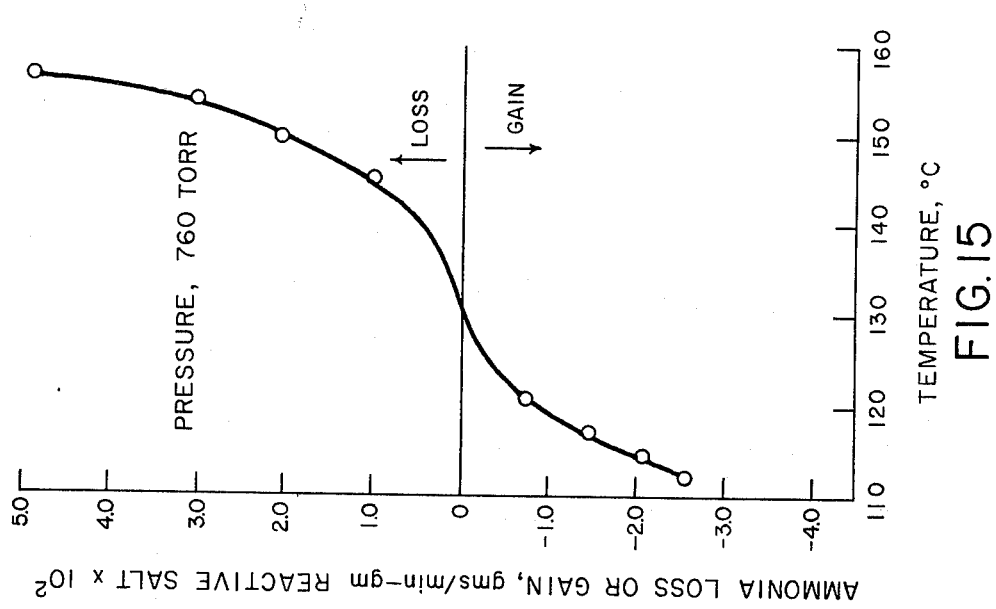
FIG. 15 is a graphical representation of the rate data for Equation (20)
Figures 16, 17:
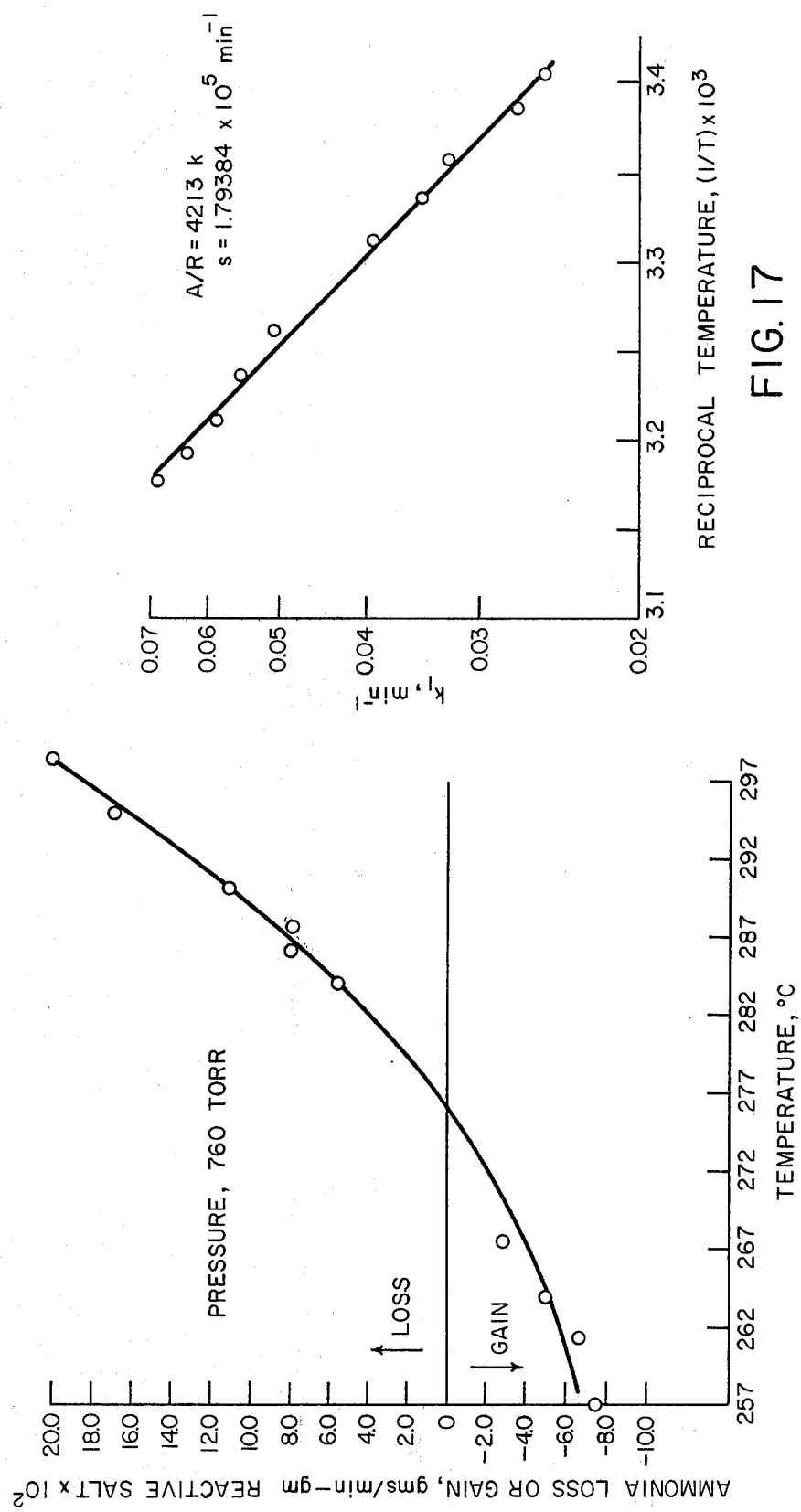
FIG. 16 is a graphical representation of the rate data for Equation (21)
FIG. 17 is a graphical representation of the Arrhenius Plot for Equation (12)

Finally, anhydrous magnesium chloride was prepared in the laboratory and this salt was used to obtain the data given in FIGS. 15 and 16 for the respective reactions:

$$MgCl_2.6NH_3 \rightleftharpoons MgCl_2.2NH_3 + 4NH_3 \qquad \text{Equation (20)}$$

and $$MgCl_2.2NH_3 \rightleftharpoons MgCl_2.NH_3 + NH_3 \qquad \text{Equation (21)}$$

This salt gave reproducible dissociation and recombination rates for both reactions, unaffected by cycling (9 cycles) with no evidence of any side reactions.

Heats of Reactions

The measured heats of reaction for the four calcium chloride ammoniates and three magnesium chloride ammonites are given in Table XIII along with the values cited in the International Critical Tables.

TABLE XIII

| Salt | Heats of Reaction | |
|---|---|---|
| | $\Delta H_{exp}$, kcal/g mole | $\Delta H_{(ICT)}$, kcal/g mole |
| 1. $CaCl_2 . 8NH_3 \rightleftharpoons CaCl_2 . 4NH_3 + 4NH_3$ | 10.1 | 9.8 |

TABLE XIII-continued

| | Heats of Reaction | |
|---|---|---|
| Salt | $\Delta H_{exp}$, kcal/g mole | $\Delta H_{(ICT)}$, kcal/g mole |
| 2. $CaCl_2 \cdot 4NH_3 \rightleftharpoons CaCl_2 \cdot 2NH_3 + 2NH_3$ | 11.1 | 10.1 |
| 3. $CaCl_2 \cdot 2NH_3 \rightleftharpoons CaCl_2 \cdot NH_3 + NH_3$ | 12.8 | 14.5 |
| 4. $CaCl_2 \cdot NH_3 \rightleftharpoons CaCl_2 + NH_3$ | 12.6 | 16.3 |
| 5. $MgCl_2 \cdot 6NH_3 \rightleftharpoons MgCl_2 \cdot 2NH_3 + 4NH_3$ | 14.6 | — |
| 6. $MgCl_2 \cdot 2NH_3 \rightleftharpoons MgCl_2 \cdot NH_3 + NH_3$ | 15.8 | 17.9 |
| 7. $MgCl_2 \cdot NH_3 \rightleftharpoons MgCl_2 + NH_3$ | 16.8 | 20.8 |

$\Delta H_{exp}$ = experimental results obtained
$\Delta H_{(ICT)}$ = theoretical results from the International Critical Tables Of the salt ammoniate reactions tested, the two reactions which appear most promising and thus are preferred for power plant thermal storage applications are:

$$CaCl_2 \cdot 8NH_3 \rightleftharpoons CaCl_2 \cdot 4NH_3 + 4NH_3 \quad \text{Equation (12)}$$

for the low temperature reaction and $$MgCl_2 \cdot 2NH_3 \rightleftharpoons MgCl_2 \cdot NH_3 + NH_3 \quad \text{Equation (21)}$$

as the high temperature reaction.

These ammoniate reactions appear to have complete reversibility and limited cycling data shows no ageing effect. The kinetics of both reactions appear to be unaffected by starting salt particle distribution after an initial "priming" cycle of the salts to bring about the large volume change accompanying the initial ammoniate formation. Both salts, and in particular the magnesium chloride, should avoid the presence of moisture.

The effect on ammoniation rates of other impurities in the salts could not be ascertained. The impurities in the calcium chloride, approximately 0.4% magnesium and other alkali salts, did not appear to affect the reversibility or reproducibility of rate data for that salt. After producing true anhydrous magnesium chloride in the laboratory, only 0.2% unknown impurities were indicated from the initial reactants.

The effects of ammonia pressure on the dissociation-recombination rates could not be studied in any detail because of pressure limits in the test apparatus. The recombination reaction, being a bimolecular reaction with one of the reactants, ammonia in the vapor phase, should be strongly dependent on total pressure.

For the general case, it is assumed that the ammoniate reaction proceeds reversibly as $$XNH_{3(s)} \rightleftharpoons X_{(s)} + NH_3 \quad \text{Equation (26)}$$

The decomposition rate, $r_1$, is given by $$r_1 = \frac{(d\,n_1/d\theta)}{(XNH_3)} = k_1(a_1); \; k_1 = F_1(T) \quad \text{Equation (27)}$$

where $k_1$ is the rate constant and $a_1$ is the activity of the higher ammoniate.

The recombination rate, $r_2$, is given by $$r_2 = \frac{(d\,n_2/d\theta)}{(X)} = K_2(a_2)\,p; \; k_2 = F_2(T) \quad \text{Equation (28)}$$

where $a_2$ is the activity of the lower ammoniate and p is the partial pressure of ammonia.

The net rate, $(r_1 - r_2)$, which is the rate measured in this program is then given by $$r_1 - r_2 = \frac{(d\,n_1/d\theta)}{XNH_3} - \frac{(d\,n_2/d\theta)}{X} k_1 a_1 \left[ 1 - \frac{k_2(a_2)}{k_1(a_1)} P \right] \quad \text{Equation (29)}$$

At equilibrium, $$r_1 - r_2 = 0; \; \frac{k_2(a_2)}{k_1(a_1)} = \frac{1}{Pe} \text{ where } a_1 \approx a_2 \approx 1 \quad \text{Equation (30)}$$

where Pe is the ammonia equilibrium vapor pressure. The net rate can then be expressed as $$r_1 - r_2 = \frac{(dn_1/d\theta)}{(XNH_3)} - \frac{(dn_2/d\theta)}{(X)} = k_1 [1 - p/Pe] \quad \text{Equation (31)}$$

where p is the system ammonia pressure.

Assuming an Arrhenius correlation to be valid for the ammoniation reaction, the dependence of $k_1$ with temperature is given by $$k_1 = s\,exp(-A/RT) \quad \text{Equation (32)}$$

where s, the frequency factor and A, the activation energy, are constants determined from experimental data by plotting $\ln k_1$ as a function of $1/T$.

If the plot of experimental data is a reasonably straight line, the original mechanism is partially confirmed.

Figure 18:
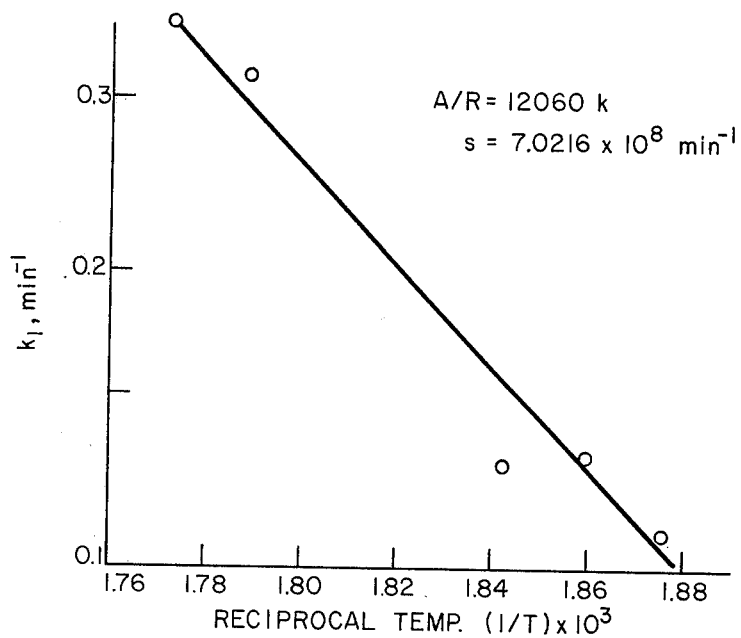
FIG. 18 is a graphical representation of the Arrhenius Plot for Equation (21)

FIGS. 17 and 18 give plots of $\ln k_1$ vs $1/T$ for the calcium choride octa-ammoniate and magnesium chloride diammoniate reactions, respectively. The activation energy, A, is determined from the slope of the line and, knowing A, s is determined from an experimental data point of $\ln k$ at a known T.

It was determined previously that the net rate, $r_1 - r_2$ is given by $$r_1 - r_2 = k_1 \cdot (1 - p/Pe) \quad \text{Equation (33)}$$

Since $k_1 = s\,exp\,(-A/RT)$ and $$Pe = Po\,exp\left[\frac{\Delta H}{R} \cdot \frac{T - T_o}{T \cdot T_o}\right] \; ; \Delta H = \text{heat of reaction}$$

$Po$ = known vapor pressure at $T_o$
The net rate can be expressed as $$r_1 - r_2 = s\,exp\,(-A/RT)\left[ 1 - p/Po\,exp\left[\frac{\Delta H}{R} \cdot \frac{T - T_o}{T \cdot T_o}\right]\right] \quad \text{Equation (34)}$$

Figure 19:
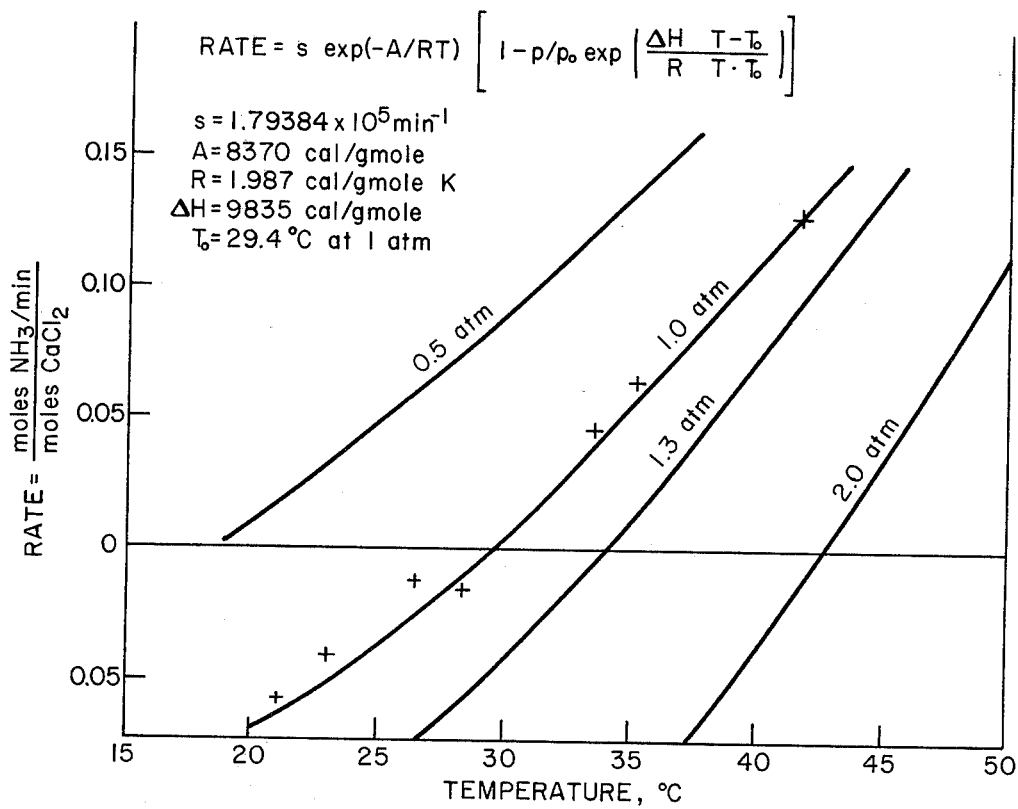
FIG. 19 is a graphical representation of the overall rate plot for the Equation (12)
Figure 20:
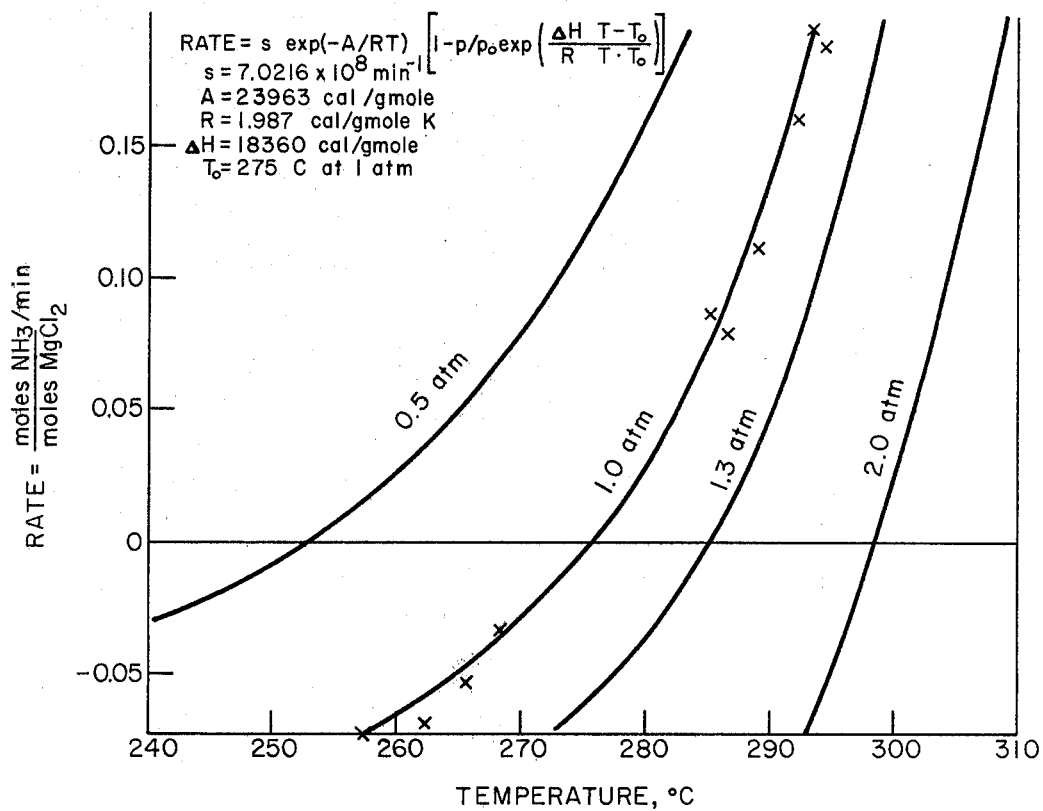
FIG. 20 is a graphical representation of the overall rate plot for the Equation (21)

FIGS. 19 and 20 give the plots of rates of dissociation and recombination of calcium chloride octa-ammoniate and magnesium chloride diammoniate reactions, respectively, as a function of temperature and ammonia pressure.

The bench-scale energy storage system is designed to accept thermal energy at 555° F. and regenerate thermal energy at about 530° F. by a two temperature level, chemical reaction system. The equilibrium reaction of ammoniated $MgCl_2$

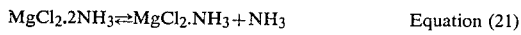

$$MgCl_2.2NH_3 \rightleftharpoons MgCl_2.NH_3 + NH_3 \qquad \text{Equation (21)}$$

was selected for the high temperature reaction. The equilibrium reaction for ammoniated $CaCl_2$

$$CaCl_2.8NH_3 \rightleftharpoons CaCl_2.4NH_3 + 4NH_3 \qquad \text{Equation (12)}$$

was selected for the low temperature reaction. The system storage capacity is 115,000 BTU, with a charge/discharge rate of 13,500 BTU per hour, equivalent to 20 pounds per hour of steam at 530° F. and 900 psia. A system schematic is shown in FIG. 21.

The high temperature $MgCl_2$ reaction is conducted in a steel cylinder 12, 1.5 ft. in diameter and 8 ft. long. The internal heat exchanger surface is constructed from one-fourth inch steel pipe (0.54 inches o.d.) on triangular centers. The ammoniated $MgCl_2$ is contained in the shell surrounding the tubes. This reactor serves as a steam condenser during the charge mode and as a water evaporator during the discharge mode. The two-phase, condensation-evaporation procedure was selected to avoid large temperature gradients in the reaction bed.

The low temperature $CaCl_2$ reaction is conducted in a cylindrical, steel vessel 14, 1.5 ft. in diameter and 5 ft. long. The internal heat exchanger surface is constructed from one-half inch o.d. steel tubing on 1 inch centers. Liquid-phase cooling water circulates through the tubes and the ammoniated $CaCl_2$ is contained in the shell surrounding the tubes. The water flow rate through the tubes is controlled to maintain the temperature gradient in the reaction bed within 10° F. of equilibrium.

The required chemical rate in the high temperature reactor is 0.002 moles of $NH_3$ per minute-mole of $MgCl_2$. The required chemical rate in the low temperature reactor is 0.003 moles of $NH_3$ per minute-mole of $CaCl_2$.

Figure 22:
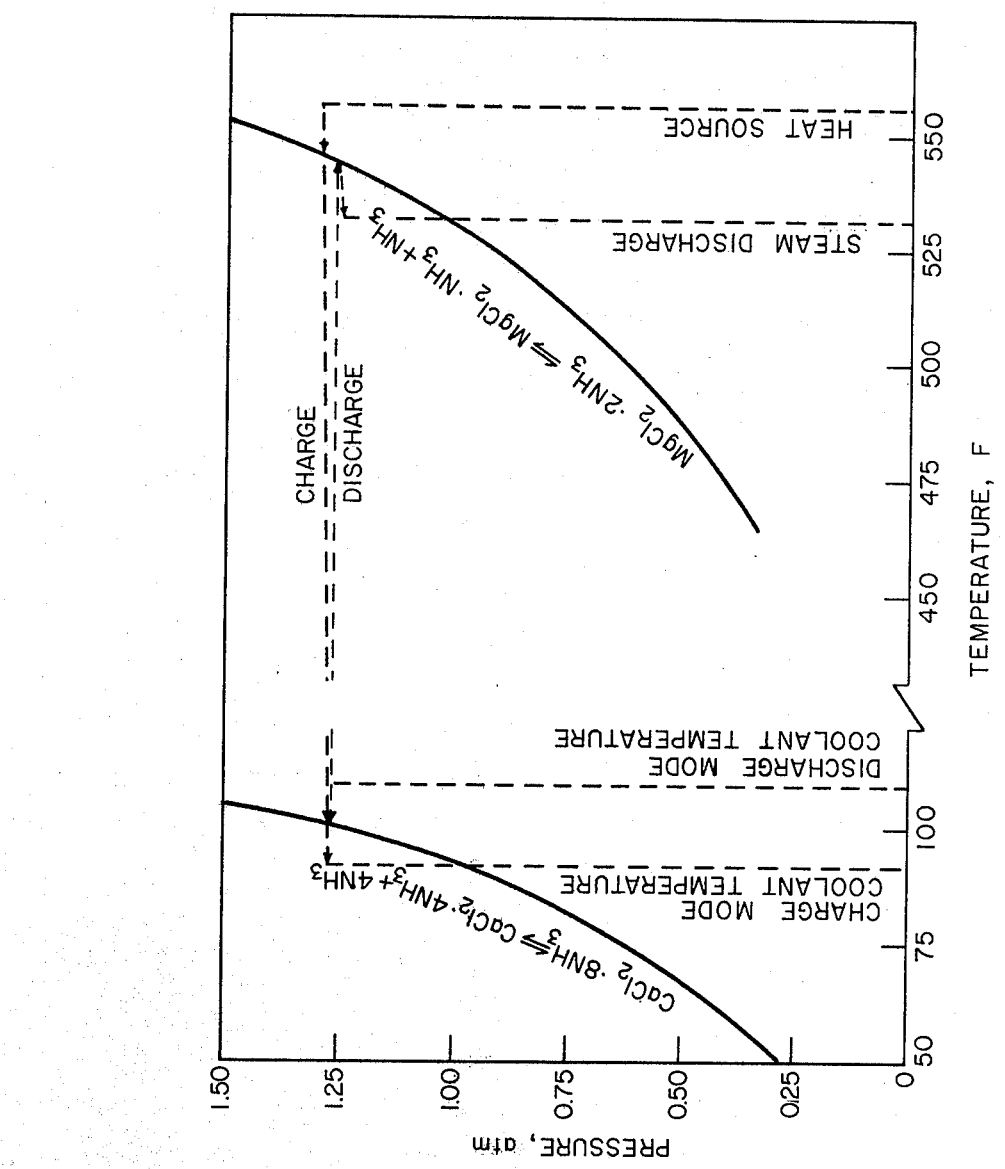
FIG. 22 is a graphical representation of the operating conditions of the system of FIG. 21.

During the charge mode, saturated steam at 560° F., 1133 psia, supplied by the steam generator 16, condenses in the high temperature reactor 12 heat exchanger tubes. The condensate collects in a sump 18 and is recirculated to the steam generator. The condensate return rate is controlled by a liquid-level controller in the condensate sump. The condensing steam supplies the endothermic heat of reaction for the $MgCl_2.2NH_3$ decomposition at 545° F. and 1.3 atmospheres as indicated in FIG. 22.

The evolved ammonia is transferred through a small pressure drop 20 to the low temperature reactor 14 where it combines with the $CaCl_2.4NH_3$ at about 100° F. and 1.28 atmospheres. The exothermic heat of reaction is removed and discharged in cooling water at an average temperature of 85° F.

During the discharge mode, water at an average temperature of 115° F. is supplied to the $CaCl_2$ reactor which decomposes $CaCl_2.8NH_3$ at essentially 100° F. and 1.28 atmospheres. The evolved ammonia is transferred to the high temperature reactor through a slight pressure drop where it reacts exothermically with $MgCl_2.NH_3$ at about 540° F.

The heat of reaction partially vaporizes water circulating through the high temperature reactor heat exchanger. The two-phase, steam/water mixture leaving the top of the high temperature reactor at 530° F. 900 psia is separated in separator 22 and the liquid phase is recycled by natural convection through the reactor heat exchanger. The saturated steam from the phase-separator is transferred to a condenser 24 where the latent heat of condensation, at about 525° F. and 850 psia, is used to heat liquid-phase water from 60° F. to 500° F., 800 psia to simulate the heating of power-plant boiler feed water. The condensate is returned to the high temperature reactor for re-evaporation.

Calcium chloride is available commercially in 100 lb bags at about 5¢ per lb. The moisture content of the commercial grade anhydrous $CaCl_2$ is quoted at $\frac{1}{2}\%$ and if adequately protected from moisture during shipment, storage and handling, it can be charged directly to the low temperature reactor and used without further treatment. However, adequate protection from moisture during handling is essential in order to obtain complete reversibility of the ammoniated salt reactions.

Magnesium chloride is available commercially only in the form of the hexahydrate ($MgCl_2.6H_2O$) in 100 lb bags at approximately 7½¢ per lb. Because low water $MgCl_2$ is essential for complete reversibility of the ammoniated salt reactions, provision must be made to dehydrate the commercial grade material. Although the complete dehydration of $MgCl_2$ hexahydrate cannot be accomplished by the simple method of heating, there are other methods of satisfying the requirement. The following method was employed and so is preferred. This procedure consists essentially of dissolving both $MgCl_2$ and $NH_4Cl$ in water followed by evaporation to obtain the complex salt, ammonium carnallite ($NH_4Cl.MgCl_2.6H_2O$). The dry ammonium carnallite can then be dehydrated by heating to 355° F. and the $NH_4Cl$ decomposed by further heating to 655° F. The material remaining is anhydrous $MgCl_2$.

Anhydrous $MgCl_2$ is transferred to the high temperature reactor without further contact with moisture. The particle size of the salt charged to the reactor is not critical because the particle size of the final ammoniated salt is not dependent on the initial particle size of the anhydrous salt.

Anhydrous ammonia of adequate purity can be obtained commercially in cylinders at about 10¢ per lb. It can be charged into both the high temperature reactor and the low temperature reactor without further purification.

Figure 23:
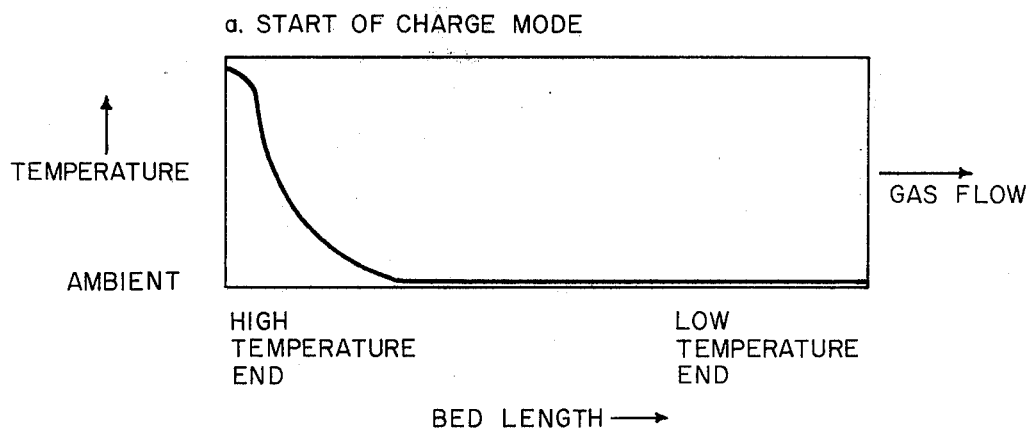
FIG. 23 is a graphical representation of the temperature profile of a regenerative exchanger during the charge mode; and, FIG. 24 is a graphical representation of the temperature profile of a regenerative exchanger during the discharge mode.
Figure 24:
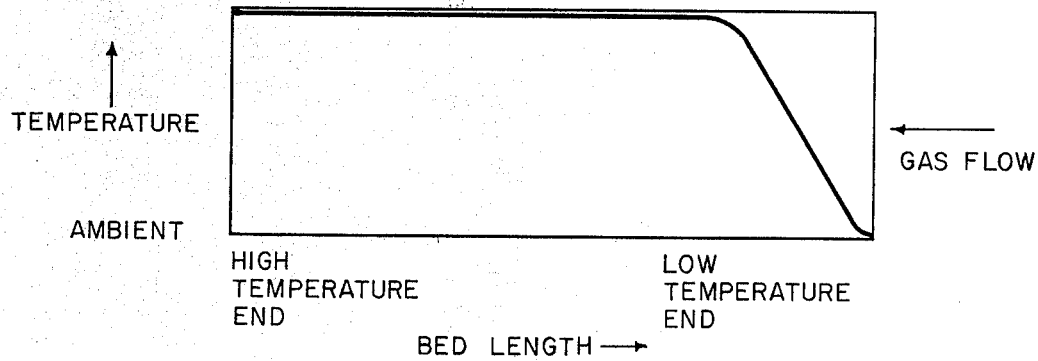

Although a detailed quantitative analysis for the thermal performance of a regenerative exchanger is relatively complex, the qualitative performance can be graphically depicted by the diagrams in FIGS. 23 and 24. At the beginning of the charge mode, FIG. 23, a temperature gradient exists near the high temperature end of the regenerative exchanger and the bulk of the exchanger mass is at a low, near ambient temperature. During the charge mode, high temperature ammonia gas enters the high temperature end of the exchanger and the temperature gradient moves down the length of the tube. With proper design, the temperature gradient will exist essentially unchanged in shape near the low temperature end of the exchanger at the end of the charge mode. The bulk of the exchanger mass is now close to the high temperature of the ammonia leaving the high temperature reactor.

The amount of heat loss experienced from the regenerative exchanger depends upon the length of time the system is held in this condition. Over a long period of time, the temperature gradient will gradually become equalized, the bed will approach a uniform temperature longitudinally and the entire exchanger mass will gradually approach ambient temperature.

Assuming the regenerative exchanger bed is held at the high temperature for a relatively short time so that the temperature gradient does not change significantly, the gas flow direction is reversed to start the discharge mode. Low temperature gas now enters the low temperature end of the exchanger and the temperature gradient moves toward the high temperature end. At the end of the discharge mode, the temperature gradient will again approach the initial shape and the bulk mass of the exchanger will again be near ambient temperature.

The condensation rate of steam generated in the high temperature reactor during the discharge mode provides the primary measure of the rate of thermal energy delivered by the system. The condenser 24, FIG. 21, itself is a vertical concentric pipe exchanger with a 1 inch standard steel pipe internal to 1½ inch standard steel pipe. The condensing section is 7½ feet long with a condensate reservoir at the lower end.

In the discharge mode, steam from the high temperature reactor 12 condenses in the internal 1 inch pipe at 525° F. and 850 psia. Liquid water, simulating power plant boiler feed water, enters the bottom of the annulus of 60° F. 800 psia and leaves the top of the annulus at 500° F. and 800 psia. The water flow rate (31 lbs/hr nominal) is controlled to maintain the exit water temperature at 500°±5° F. The rate of energy transfer is determined from the measured flow rate and temperature rise of the cooling water. The condensate return rate is controlled by the liquid level in the condensate reservoir.

The steam generator 16 supplies steam at 560° F., 1133 psia to the high temperature reactor 12 during the charge mode. The steam generator consists of a 3 inch standard steel pipe inside a 6 inch standard steel pipe 5 feet long. Six inch pipe caps are welded to the output pipe to provide end closures. A thermostated, 6 KW electrical heater inside the inner 3 inch pipe provides the primary energy source.

In the charge mode, the electrical heater produces a two-phase, vapor-liquid mixture in the internal 3 inch pipe. The two-phase mixture leaving the top of the 3 inch pipe is separated by a baffle and the wet steam leaves the generator at 560° F. and 1133 psia. The separated liquid phase collects in the annular space between the 3 inch and 6 inch sizes and returns to the internal two-phase region by natural convection.

The exit steam is condensed in the high temperature reactor and returned for re-evaporation. The heater thermostat is controlled by a pressure sensor in the exit steam line.

The cooling water temperature conditioning system supplies water to the low temperature reactor at a controlled temperature and a controlled flow rate. The system consists of a counter/current, concentric pipe heat exchanger 26 and a thermostated 10 KW electrical water heater 28 as shown in FIG. 21. The heat exchanger serves to preheat the incoming cold water by exchange with the warmer water from the low temperature reactor. The water heater serves to control the water temperature entering the low temperature reactor by mixing hot water with the preheated water.

The concentric pipe exchanger consists of a 1 inch standard pipe (1.315" o.d.) inside a 1½ inch standard pipe (1.55" i.d.), 12 feet long (or 2, 6 foot sections in series) containing 4.13 sq. ft. of heat transfer area. Assuming 60° F. inlet water temperature, the exchanger will preheat 730 lbs/hr of water to 72.5° F. during the charge mode and to 80.9° F. during the discharge mode. The water heater then, in effect, must increase the 730 lbs/hr of water from 72.5° F. to 80° F. during the charge mode, and from 80.9° F. to 120° F. during the discharge mode. Therefore, the maximum load on the hot water heater is 730 (120-80.9)/3413 = 8.36 KW.

The hot water heater is set to maintain a constant outlet temperature of 140° F. independent of flow rate. A temperature sensor at the inlet of the low temperature reactor controls the rate of the 140° F. hot water which mixes with the preheated water from the exchanger to provide a constant preset temperature to the reactor. A temperature sensor at the reactor outlet controls the total water flow rate through the reactor to maintain a preset outlet temperature approximately 10° F. higher than the inlet temperature during the charge mode, and 10° F. lower than the inlet temperature during the discharge mode.

Test procedures are outlined below under the headings of Raw Material Preparation, Charge Mode Operation, and Discharge Mode Operation. The numerical values cited are consistent with the system design concepts but are subject to change.

Raw Material Preparation

1. Load 227 lbs of "as received" $CaCl_2$ in low temperature reactor. Procedure must take precautions to protect $CaCl_2$ from atmospheric moisture.
2. Load 750 lbs of $MgCl_2 \cdot 6H_2O$ in mix tank.
3. Load 300 lbs of $NH_4Cl$ in mix tank.
4. Add sufficient water to dissolve salt.
5. Transfer salt solution to evaporator.
6. Heat to dryness at 250° F. and collect evaporated water in mix tank.
7. Dehydrate by heating to 355° F. and collect water in mix tank.
8. Decompose $NH_4Cl$ by heating to 655° F. and collect $NH_4Cl$ in mix tank.
9. Purge evaporator with dry $N_2$.
10. Transfer anhydrous $MgCl_2$ to $N_2$ purged bags or closed container.
11. Load 339 lbs of anhydrous $MgCl_2$ in high temperature reactor.
12. Fill high temperature reactor reservoir and steam generator with water.
13. Fill low temperature reactor and coolant conditioning system with water.
14. Circulate cooling water through condenser.
15. Set valves for discharge mode operation and start circulating pump.
16. Add 121 lbs of $NH_3$ to high temperature reactor. Determine weight by placing $HN_3$ cylinder on scale.
17. Start cooling water through low temperature reactor.
18. Add 179 lbs of $HN_3$ to low temperature reactor.

Charge Mode Operation

1. Place valves in position for charge mode operation.
2. Start steam generator and bring to 560° F., 1133 psia.

3. Open steam valve to high temperature reactor and bring reaction bed to 545° F., 1.3 atm (19.11 psia). Condensate recirculation pump should operate automatically from liquid level controller in high temperature sump.
4. Set coolant water temperature control at inlet of low temperature reactor to 80° F. and open ammonia valve in transfer line.
5. Set coolant water temperature control at exit of low temperature reactor to 90° F. Coolant water rate should be controlled at approximately 730 lbs/hr.
6. Operate in charge mode from 4 to 6 hours.
7. Close ammonia line valve at low temperature reactor and shutdown steam generator.

Discharge Mode Operation

1. Place valves in position for discharge mode to operate high temperature reactor as an evaporator.
2. Set water inlet temperature to low temperature reactor to 120° F. Set water exit temperature from low temperature reactor to 110° F.
3. Open ammonia line valve.
4. Bring high temperature reactor to 540° F., 1.2 atm (17.6 psia). Partial evaporation and natural circulation should occur.
5. Start water flow through condenser and open steam valve.
6. Condenser cooling water temperature should rise to 500° F. (at 800 psia) and control water rate to maintain temperature at this value.
7. Condensate recycle pump should operate automatically from condenser sump liquid level controller.
8. Operate in discharge mode for 4 to 6 hours.
9. Close ammonia line valve at low temperature reactor and shut off cooling water to both the low temperature reactor and condenser.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

We claim:

1. A method of storing energy and recovering same on demand, which energy storage steps comprise:
    (a) Providing, in an enclosed reaction zone, a first chemical compound which reacts solely upon the application of thermal energy thereto to produce a gas and a second chemical compound,
    (b) Providing, in an enclosed storage zone, a third chemical compound which reacts solely upon the application of thermal energy thereto to produce a gas and a fourth chemical compound, both of the reactions involving said first and third chemical compounds being reversible, having essentially the same equilibrium vapor pressure at two different temperatures, and producing a gas which is a common reactant or product in said reversible chemical reactions, such that by a change in temperature the equilibrium can be shifted to dissociate or recombine said gas in each of said reactions, said reaction and storage zones being in continuous open communication, whereby said gas can flow freely between said zones,
    (c) Providing a thermal energy storage means,
    (d) Supplying a source of thermal energy to said reaction zone to raise the temperature of said reaction zone and said first chemical compound, whereby said first chemical compound will react to evolve said gas and said second chemical compound and whereby the pressure in said reaction zone is increased higher than the pressure in said storage zone and a pressure differential results between said zones and causes said gas to flow from said reaction to said storage zone,
    (e) Flowing said gas to said storage zone,
    (f) Reacting said gas with said fourth chemical compound to form said third chemical compound and to evolve thermal energy and thereby raise the temperature of said storage zone, whereby a temperature differential will result between said storage zone and said thermal energy storage means and cause the evolved thermal energy to flow from said storage zone to said thermal energy storage means, and
    (g) Storing the thermal energy evolved in said storage zone in said thermal energy storage means, whereby the thermal energy from the source will be stored and the pressure between said reaction and storage zones and the temperature between said storage zone and said thermal energy storage means will become equalized, and
which energy recovery steps comprise:
    (h) Drawing thermal energy from said reaction zone to lower the temperature and pressure of said reaction zone, whereby a pressure differential will result between said reaction and storage zones and cause said gas to flow from said storage zone to said reaction zone,
    (i) Flowing said gas to said reaction zone, whereby said third chemical compound will react to evolve said gas and the temperature in said storage zone will be lowered resulting in a temperature differential between said storage zone and said thermal energy storage means and cause thermal energy to flow from said thermal energy zone to said storage zone, and
    (j) Flowing thermal energy from said thermal energy storage means to said storage zone, whereby the temperature between said thermal energy storage means and said storage zone and the pressure between said storage and reaction zones will become equalized and whereby stored energy is recovered.

2. The method of claim 1 wherein the chemical compounds are solids.

3. The method of claim 1 wherein the chemical compounds are selected from the group consisting of ammoniated salts, copper chloride, chlorine hydrate, alcoholates, hydrates, and salts combined with ethers and ketones.

4. The method of claim 1 wherein the chemical compounds are ammoniates of calcium chloride and lithium chloride.

5. The method of claim 1 wherein the chemical compounds are chosen such that they have equilibrium vapor pressures that are essentially identical at the operating temperatures of the reaction zone and the storage zone.

6. The method of claim 1 wherein the thermal energy storage means is a phase change material adapted to absorb thermal energy at substantially the same temperature while undergoing a change in phase.

7. The method of claim 6 wherein the phase change material is lithium nitrate trihydrate.

8. The method of claim 1 wherein the thermal energy storage means is a large body of water.

9. The method of claim 1 wherein the chemical compounds are ammoniates of metal chlorides.

10. The method of claim 1 wherein only a gas reaction product is transferred between the reaction zone and the storage zone.

11. The method of claim 1 wherein the first and second chemical compounds are ammoniates of ferrous chloride and the third and fourth chemical compounds are ammoniates of calcium chloride.

12. An apparatus for storing energy and recovering same on demand comprising:
(a) An enclosed reaction cell means for containing a first chemical compound which reacts solely upon the application of thermal energy thereto to produce a gas and a second chemical compound,
(b) An enclosed storage vessel means for containing a third chemical compound which reacts solely upon the application of thermal energy thereto to produce a gas and a fourth chemical compound, both of the reactions involving said first and third chemical compounds being reversible, having essentially the same equilibrium vapor pressure at two different temperatures, and producing a gas which is a common reactant or product in said reversible chemical reactions, such that by a change in temperature the equilibrium can be shifted to dissociate or recombine said gas in each of said reactions,
(c) Means connecting both said reaction cell and storage vessel means, which connecting means is in continuous open communication with both said reaction cell means and storage vessel means, whereby said gas can flow freely between said reaction cell means and said storage vessel means,
(d) Heat exchange means operatively connected to said reaction cell means to receive and transmit thermal energy to and from said reaction cell means,
(e) Thermal energy storage means operatively connected to said enclosed storage cell means for receiving and supplying thermal energy from said storage vessel means, and
(f) Heat exchange means operatively connected to both said storage vessel means and said thermal energy storage means for transmitting thermal energy between said storage vessel means and said thermal energy storage means.

13. The apparatus of claim 12 wherein the chemical compounds of the system are selected to provide a pair of solids-gas systems that have the same equilibrium vapor pressures at two different temperatures.

14. The apparatus of claim 12 wherein the chemical compounds are ammoniates of metal chlorides.

15. The apparatus of claim 12 wherein the chemical compounds are selected from the group consisting of ammoniated salts, copper chloride, chlorine hydrate, alcoholates, hydrates, and salts combined with ethers and ketones.

16. The apparatus of claim 12 wherein the chemical compounds are respectively ammoniates of calcium chloride and lithium chloride.

17. The apparatus of claim 12 wherein the first and second chemical compounds are ammoniates of ferrous chloride and the third and fourth chemical compounds are ammoniates of calcium chloride.

* * * * *